(12) United States Patent
Nakayama et al.

(10) Patent No.: US 8,712,048 B2
(45) Date of Patent: Apr. 29, 2014

(54) INFORMATION RECORDING MEDIUM AND INFORMATION PROCESSING METHOD FOR ACCESSING CONTENT WITH LICENSE OR COPYRIGHT PROTECTION

(75) Inventors: Tsuyoshi Nakayama, Kanagawa (JP); Chikako Mori, Tokyo (JP); Yoshimichi Kitaya, Kanagawa (JP); Yoshikazu Kouno, Kanagawa (JP)

(73) Assignee: Sony Corporation, Tokyo (JP)

( * ) Notice: Subject to any disclaimer, the term of this patent is extended or adjusted under 35 U.S.C. 154(b) by 217 days.

(21) Appl. No.: 12/801,101

(22) Filed: May 21, 2010

(65) Prior Publication Data

US 2010/0296652 A1     Nov. 25, 2010

Related U.S. Application Data

(63) Continuation of application No. 10/515,271, filed as application No. PCT/JP2004/002921 on Mar. 5, 2004, now Pat. No. 7,734,047.

(30) Foreign Application Priority Data

Mar. 24, 2003  (JP) ................................. 2003-079827

(51) Int. Cl.
    *G06F 21/00*     (2013.01)
(52) U.S. Cl.
    USPC ............. 380/201; 711/163; 713/193; 726/32; 705/59
(58) Field of Classification Search
    USPC ........................................................ 380/201
    See application file for complete search history.

(56) References Cited

U.S. PATENT DOCUMENTS

| 5,629,980 A | 5/1997 | Stefik et al. |
| 5,761,301 A | 6/1998 | Oshima et al. |

(Continued)

FOREIGN PATENT DOCUMENTS

| EP | 1 265 396 A1 | 12/2002 |
| JP | 08-185444 | 7/1996 |

(Continued)

OTHER PUBLICATIONS

"Sony Corporation;" Press Release: Developed "Postscribed ID™ technology which enables individual information recording in CD-ROM disks."; [online]; May 29, 2002; [retrieved on May 27, 2004]; retrieved from the Internet http://www.sony.co.jp/SonyInfo/News/Press/200205/02-021.

(Continued)

*Primary Examiner* — Hadi Armouche
*Assistant Examiner* — Bryan Wright
(74) *Attorney, Agent, or Firm* — Finnegan Henderson Farabow Garrett & Dunner LLP

(57) ABSTRACT

There are provided an information recording medium, an information processing apparatus, an information processing method, and a computer program, which can realize users' convenience for using content in accordance with a license and copyright protection. An information recording medium stores an encrypted content file including encrypted content, usage right information of the encrypted content, and encryption key information necessary for a decrypting process for the encrypted content. Thus, a user can acquire a license (usage right information) and key information necessary for decryption of the content, together with the content, from the information recording medium, without acquiring the license (usage rights) by connection to a license provider. Therefore, it is no longer necessary to perform a process of acquiring the license (usage rights) from the license provider when the content is to be used, whereby user convenience is improved, and license-based content copyright management can also be ensured.

4 Claims, 21 Drawing Sheets

(56) References Cited

U.S. PATENT DOCUMENTS

| | | | |
|---|---|---|---|
| 6,047,292 | A | 4/2000 | Kelly et al. |
| 6,873,975 | B1 | 3/2005 | Hatakeyama et al. |
| 6,950,941 | B1* | 9/2005 | Lee et al. .................. 713/193 |
| 7,644,446 | B2* | 1/2010 | Strom et al. ................ 726/32 |
| 2001/0019615 | A1 | 9/2001 | Kato et al. |
| 2001/0032312 | A1 | 10/2001 | Runje et al. |
| 2002/0059144 | A1* | 5/2002 | Meffert et al. ............... 705/51 |
| 2002/0087818 | A1 | 7/2002 | Ripley et al. |
| 2002/0147906 | A1 | 10/2002 | Lotspiech et al. |
| 2002/0178145 | A1 | 11/2002 | Ishida |
| 2002/0186844 | A1* | 12/2002 | Levy et al. ................. 380/231 |
| 2003/0002671 | A1 | 1/2003 | Inchalik et al. |
| 2003/0037006 | A1 | 2/2003 | Maruyama et al. |
| 2003/0159037 | A1 | 8/2003 | Taki et al. |
| 2004/0027942 | A1 | 2/2004 | Sako |
| 2004/0205358 | A1* | 10/2004 | Erickson ..................... 713/200 |
| 2005/0021398 | A1* | 1/2005 | McCleskey et al. ........... 705/14 |
| 2005/0177875 | A1* | 8/2005 | Kamperman et al. .......... 726/27 |
| 2005/0216743 | A1 | 9/2005 | Peinado |

FOREIGN PATENT DOCUMENTS

| | | |
|---|---|---|
| JP | 2000-293439 | 10/2000 |
| JP | 2002-215465 | 8/2002 |
| JP | 2002-324349 | 11/2002 |
| JP | 2003-045116 | 2/2003 |
| JP | 2003-215465 | 7/2003 |
| WO | WO 02/056535 A1 | 7/2002 |
| WO | WO 03/012787 A1 | 2/2003 |

OTHER PUBLICATIONS

"Press Release CD-ROM Disc eno Kobetsu Joho Kiroku o Kano ni suru Postscribed ID™· Gijutsu o Kaihatsu", [online], Sony Corp., May 29, 2002.

\* cited by examiner

Fig.7A

EKB : ENABLING KEY BLOCK EXAMPLE 1

TRANSMIT NODE KEYS OF
VERSION t TO DEVICES 0, 1, 2

| VERSION : t | |
|---|---|
| INDEX | ENCRYPTED KEY |
| 0 | Enc(K(t)0,K(t)R) |
| 00 | Enc(K(t)00,K(t)0) |
| 000 | Enc(K000,K(t)00) |
| 001 | Enc(K(t)001,K(t)00) |
| 0010 | Enc(K0010,K(t)001) |

Fig.7B

EKB : ENABLING KEY BLOCK EXAMPLE 2

TRANSMIT NODE KEYS OF
VERSION t TO DEVICES 0, 1, 2

| VERSION : t | |
|---|---|
| INDEX | ENCRYPTED KEY |
| 000 | Enc(K000,K(t)00) |
| 001 | Enc(K(t)001,K(t)00) |
| 0010 | Enc(K0010,K(t)001) |

*Fig.14A*
ENCRYPTION KEY
INFORMATION
(SERVICE DATA)
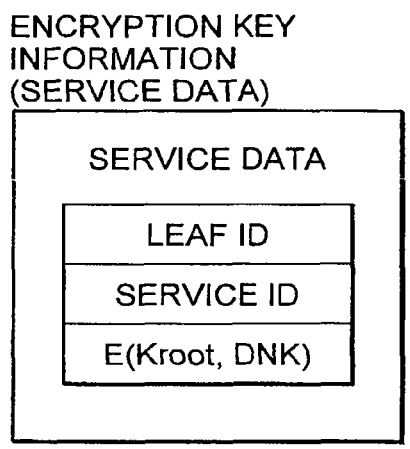
*Fig.14B*
USAGE RIGHT
(LICENSE)
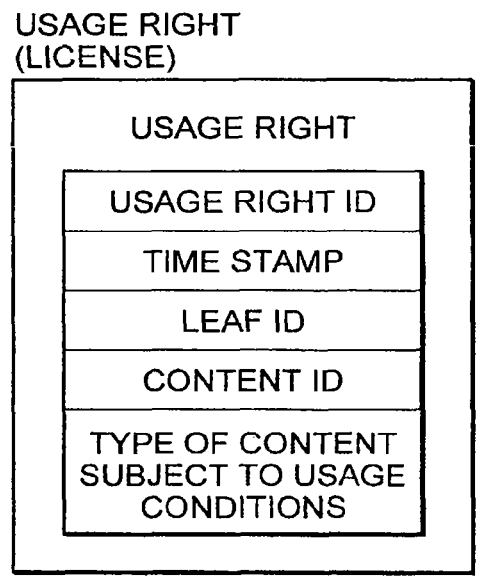
*Fig.14C*
CONTENT
| SERVICE ID | EKB | Enc(Kroot, Kc) | Enc(Kc, Content) |
|---|---|---|---|

Fig. 15

| USAGE | | DESCRIPTION |
|---|---|---|
| PLAYABLE | TIME-LIMIT | • W/O LIMIT<br>• W/ LIMIT, START-TIME/END-TIME IN ABSOLUTE TIME OR RELATIVE TIME |
| | MAX COUNT OF PLAYBACK | • W/O LIMIT<br>• W/ LIMIT, IN NUMBER |
| IMPORTABLE | OFFLINE IMPORT | • YES<br>• NO |
| | ONLINE IMPORT | • YES<br>• NO |

*Fig.16*

| | USAGE | DESCRIPTION |
|---|---|---|
| PLAYBACK | TIME-LIMIT | • W/O LIMIT<br>• W/ LIMIT, START-TIME/END-TIME IN ABSOLUTE TIME OR RELATIVE TIME |
| | MAX COUNT OF PLAYBACK | • W/O LIMIT<br>• W/ LIMIT, IN NUMBER |
| CHECK-OUT | DEVICE CATEGORY | • BIT-FLAG FOR EACH DEVICE TYPE, SUCH AS MS-WALKMAN, NET-MD, ETC. |
| | MAX COUNT OF CHECK-OUT | • W/O LIMIT<br>• W/ LIMIT, IN NUMBER |
| CD-R BURN | DEVICE CATEGORY | • BIT-FLAG FOR EACH DEVICE TYPE, SUCH AS CDDA CD-R, AT3 CD-R, ETC. |
| | MAX COUNT OF CD-R BURN | • W/O LIMIT<br>• W/ LIMIT, IN NUMBER |

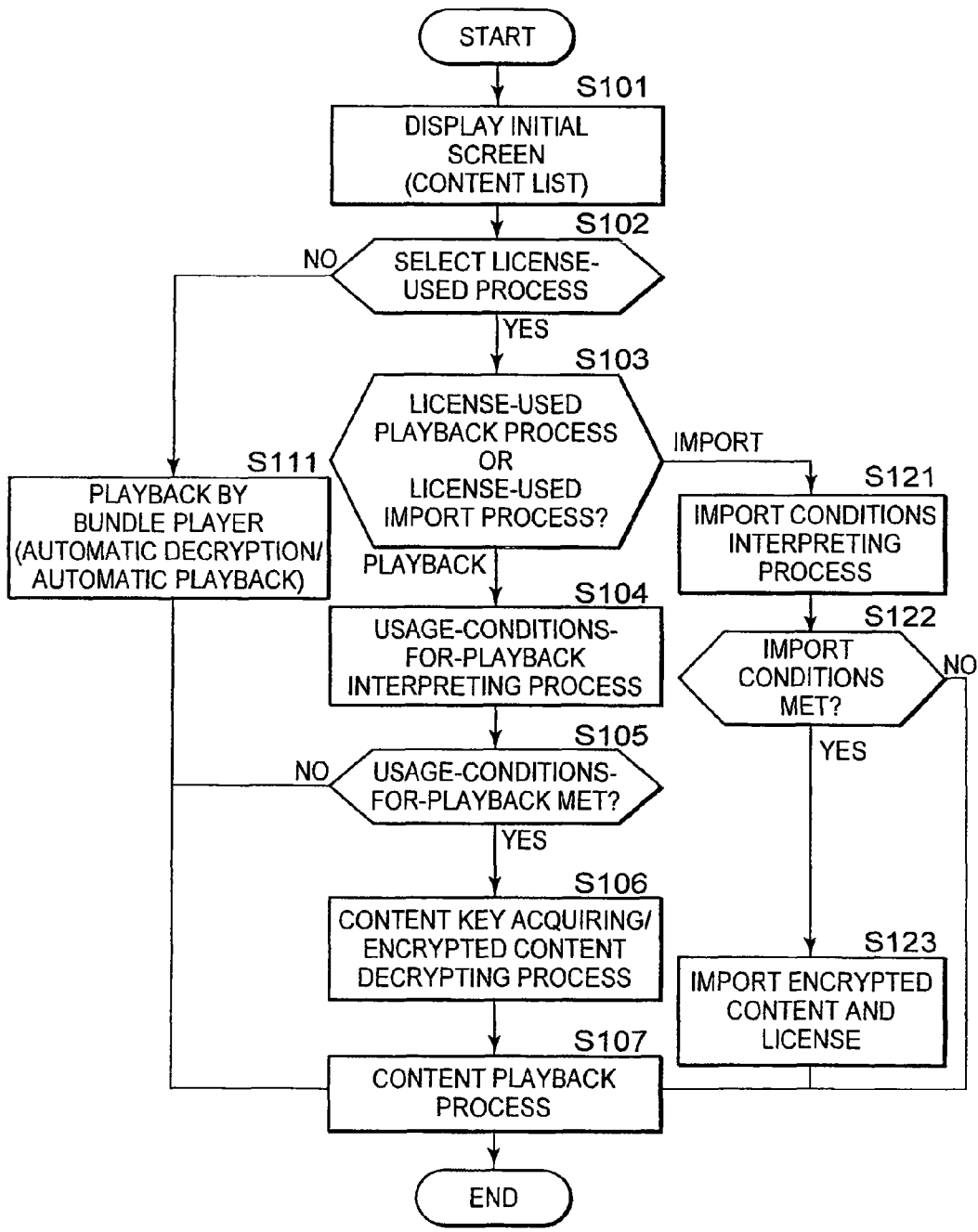

INFORMATION RECORDING MEDIUM AND INFORMATION PROCESSING METHOD FOR ACCESSING CONTENT WITH LICENSE OR COPYRIGHT PROTECTION

RELATED APPLICATIONS

This application is a continuation of U.S. application Ser. No. 10/515,271, filed on Aug. 18, 2005 now U.S. Pat. No. 7,734,047, the entire contents of which are incorporated herein by reference. In addition, this application claims the benefit of priority to Japanese patent application number 2003-079827, filed in the Japanese Patent Office on Mar. 24, 2003, which is incorporated herein by reference in its entirety.

TECHNICAL FIELD

The present invention relates to an information recording medium, an information processing apparatus, an information processing method, and a computer program. More particularly, the present invention relates to an information recording medium, an information processing apparatus, an information processing method, and a computer program, which can implement appropriate content copyright management for content and which have improved user convenience for using the content, by configuring such that a data recording field in which encrypted content is recorded is set wherein, and such that license information having content usage conditions recorded therein, and encryption keys necessary for playback processing are stored, to and on a content recording medium such as a CD.

BACKGROUND ART

Nowadays, various software data including audio data such as music, picture data such as movies, game programs, various application programs (hereinafter called "content") are circulating via a network such as the Internet or via an information recording medium (media) such as a CD (Compact Disc), a DVD (Digital Versatile Disc), an MD (Mini Disk). Such circulating content is played and used in a playback apparatus such as a PC (Personal Computer), a CD player, a DVD player, an MD player, a game machine, or the like owned by a user.

As to many of content such as music data, movie data, their distribution rights and the like are usually held by their creators or sellers. Therefore, when such content is distributed, it is commonplace to impose certain limitations on its use; i.e., to license use of the content to only an authorized user to prevent unauthorized duplication and the like.

Particularly in recent years, recording apparatuses and storage media that digitally record information are becoming popular. Using these digital recording apparatuses and storage media, recording, playback can be repeated without deteriorating, images and sound, for example. Since digital data can be copied again and again with their image and sound quality maintained, once illegally copied storage media come to circulate through the market, the interests of the copyright holders, legitimate distributors and the like of various content such as music, movies would be damaged. In order to prevent such unauthorized copying of digital data, various processing configurations have been implemented or proposed nowadays for preventing illegal copying to digital recording apparatuses and storage media.

Devised as some copyright protection technologies to prevent such situations is an information recording medium provided with a copy control function (e.g., a CD with a copy protection function). The copy protection function includes, e.g., copy control technology developed by Midbar Tech Ltd. and copy control technology developed by Macrovision Corporation, U.S.

In these technologies, e.g., a false signal is inserted into the first track of a CD, whereby when the CD is set into a CD-ROM drive of a PC, the PC is not allowed to recognize the CD as a music CD thereby to prohibit playback processing by a CD player program of the PC. An ordinary CD player unable to perform ripping processing can execute playback of only the content data by neglecting the false signal.

When trying to play an information recording medium such as a CD having copy-controlled content recorded thereon, a playback-only CD player can play the content, but a PC or the like cannot play it.

However, such copy-protected processing might end up in hampering use of content in which, e.g., one enjoy playing the content in a portable player or the like by copying or moving the content to a PC, and then by, e.g., copying it to a recording medium such as a flash-memory.

As an approach to accommodating situations such as above, a configuration has been proposed, wherein content to be stored on an information recording medium such as a CD is distributed after encryption, and also a license is provided to a user, in which content usage right information including a limitation on the number of copies of the content, a limitation on the period of use of the content is described. This configuration allows use of the content in various forms, such as permitting only a user having purchased the license to acquire a key for decrypting the encrypted content to perform copying and the like of the content under predetermined limitations whereby to implement copyright protection for the content and improve user convenience.

For example, SDMI (Secure Digital Music Initiative) that has proposed various music distribution technology specifications proposes standards of copyright protection functions for portable players. Implementations of copyright protection functions come in various forms, such as a limitation on the number of copies of content, a limitation on the period of use of the content. Thus, by purchasing a license wherein usage right information corresponding to the content is set, the user can use the content under predetermined conditions.

The encrypted content and its license are distributed independently. A typical, conventionally proposed configuration therefor is to provide the encrypted content to a user after storage on an information recording medium such as a CD, a DVD, an MD, and to distribute the license via, e.g., a network such as the Internet. For example, a user who has purchased a CD having encrypted content stored thereon establishes a connection to a license provider using a network-connectable terminal such as a PC, performs a license acquiring process that is conditional on payment of a predetermined fee, further acquires a key applied to decryption of the encrypted content on the basis of the acquired license, and thereafter decrypts the encrypted content using the acquired key for playback.

DISCLOSURE OF THE INVENTION

As mentioned above, the user acquires the license that specifies various content usage right information such as the number of times the content may be copied, the number of times the content may be played, whereby use of the content according to the license can be implemented. However, such a license acquiring procedure is extremely cumbersome for the user. The user, unaccustomed to connecting to a network would even give up using the content itself if such a license acquiring procedure is required.

The user needs to follow the license acquiring procedure even when using only one item of content stored on a CD. In order to acquire a license, the user must access a license provider, input various data such as user or terminal information, fee payment conditions, be acknowledged by the license provider. Forcing the user to perform such processing would hamper use of the content.

The present invention has been made in view of the above-mentioned problems, and thus provides an information recording medium, an information processing apparatus, an information processing method, and a computer program, which when encrypted content stored on an information recording medium such as a CD is to be used, can eliminate the license acquiring process performed via a network, improving user convenience, and reliably implementing copyright management for the content.

A first aspect of the present invention is
an information recording medium having encrypted content stored thereon, characterized by storing:
an encrypted content file including encrypted content;
usage right information about the above-mentioned encrypted content; and
encryption key information necessary for a decrypting process for the above-mentioned encrypted content.

Furthermore, in an embodiment of the information recording medium of the present invention, the above-mentioned information recording medium is characterized by having a multi-session configuration wherein a plurality of sessions as segmented information recording areas are provided, and having a session set as a content storage area on which a copy protection process has been performed, in addition to a session wherein the above-mentioned encrypted content, the usage right information about the above-mentioned encrypted content, and the encryption key information necessary for the decrypting process for the encrypted content are stored.

Furthermore, in an embodiment of the information recording medium of the present invention, the above-mentioned information recording medium is characterized by being configured to store a media identifying data (PID: Post scribed-ID) as an identifier unique to the information recording medium.

Furthermore, in an embodiment of the information recording medium of the present invention, the above-mentioned media identifying data (PID: Post scribed-ID) is characterized by including a MAC (Message Authentication Code) as data for verifying falsification.

Furthermore, in an embodiment of the information recording medium of the present invention, the above-mentioned encrypted content file is characterized by being configured to include encrypted content, an encrypted content key that is encrypted data on a content key as a decryption key for the encrypted content, and an enabling key block (EKB) as encrypted key data that can acquire a key applied to decryption of the above-mentioned encrypted content key, and the above-mentioned encryption key information is characterized by being configured to include a device node key (DNK) as key information applied to a process for the enabling key block (EKB) included in the above-mentioned encrypted content file.

Furthermore, in an embodiment of the information recording medium of the present invention, the above-mentioned device node key (DNK) is characterized by being key information set on the basis of a key providing configuration that is based on a hierarchical key tree structure.

Furthermore, in an embodiment of the information recording medium of the present invention, the above-mentioned information recording medium is characterized by further comprising a content using program including a playback process for the above-mentioned encrypted content, and the content using program is characterized by including a program for performing a control process over use of content that is based on the above-mentioned usage right information.

Furthermore, in an embodiment of the information recording medium of the present invention, the above-mentioned information recording medium is characterized by including a plurality of different forms of encrypted content files, which are an encrypted content file usable on the basis of a confirming process for usage rights according to the usage right information stored on the above-mentioned information recording medium, and an encrypted content file usable based on a confirming process for usage rights according to the usage right information that is not stored on the above-mentioned information recording medium, but that can be acquired from a license provider.

Furthermore, a second aspect of the present invention is
an information processing apparatus performing a using process for encrypted content stored on an information recording medium, characterized by being configured to read
an encrypted content file including encrypted content stored on an information recording medium,
usage right information corresponding to the above-mentioned encrypted content and stored on the above-mentioned information recording medium, and
encryption key information necessary for a decrypting process for the above-mentioned encrypted content and stored on the above-mentioned information recording medium,
from the above-mentioned information recording medium, and
perform use of the content on condition that the use of the content is use of the content permitted by a description of the read usage right information.

Furthermore, in an embodiment of the information processing apparatus of the present invention, the using process for the above-mentioned encrypted content is characterized by including a playback process for the content, and the above-mentioned information processing apparatus is characterized by performing the playback process for the content on condition that the playback process for the content is a playback process for the content permitted by a description of the usage right information read from the above-mentioned information recording medium.

Furthermore, in an embodiment of the information processing apparatus of the present invention, the using process for the above-mentioned encrypted content is characterized by including an import process for the content, and the above-mentioned information processing apparatus is characterized by being configured to perform the import process for the content on condition that the import process for the content is an import process for the content permitted by a description of the usage right information read from the above-mentioned information recording medium, and to import the usage right information read from the above-mentioned information recording medium together with the content when performing the import process for the content.

Furthermore, in an embodiment of the information processing apparatus of the present invention, the usage right information imported to the above-mentioned information processing apparatus is characterized by being usage right information describing usage conditions for the content that has been imported.

Furthermore, in an embodiment of the information processing apparatus of the present invention, the above-mentioned usage right information is characterized by being information describing at least any of permission conditions for playing, checking out, or copying the content.

Furthermore, in an embodiment of the information processing apparatus of the present invention, the above-mentioned information processing apparatus is characterized by being configured to perform a verifying process for a MAC (Message Authentication Code) as data for verifying falsification of a media identifying data (PID: Post scribed-ID) read from the above-mentioned information recording medium, and to perform use of the content on condition that the media identifying data (PID: Post scribed-ID) has been determined unfalsified.

Furthermore, in an embodiment of the information processing apparatus of the present invention, the above-mentioned information processing apparatus is characterized by being configured to acquire the content by decryption of the encrypted content file read from the above-mentioned information recording medium, while applying the encryption key information read from the above-mentioned information recording medium.

Furthermore, in an embodiment of the information processing apparatus of the present invention, the encrypted content file stored on the above-mentioned information recording medium is characterized by being a file including encrypted content, an encrypted content key that is encrypted data of a content key as a decryption key for the above-mentioned encrypted content, and an enabling key block (EKB) as encrypted key data that can acquire keys applied to decryption of the above-mentioned encrypted content key, and the above-mentioned information processing apparatus is characterized by being configured to perform a process for the enabling key block (EKB) by acquiring a device node key (DNK) as key information applied to the process for the enabling key block (EKB) included in the above-mentioned encrypted content file, from the above-mentioned encryption key information.

A third aspect of the present invention is
an information processing method of performing a using process for encrypted content stored on an information recording medium, characterized by comprising:
a data reading step of reading:
an encrypted content file including encrypted content stored on an information recording medium,
usage right information corresponding to the above-mentioned encrypted content and stored on the above-mentioned information recording medium, and
encryption key information necessary for a decrypting process for the above-mentioned encrypted content and stored on the above-mentioned information recording medium,
from the information recording medium;
a usage right information confirming step of confirming use of the content permitted by a description of the usage right information read in the above-mentioned data reading step; and
a content using step of performing use of the content on condition that the use of the content is confirmed to be permitted by the description of the usage right information, in the above-mentioned usage right information confirming step.

Furthermore, in an embodiment of the information processing method of the present invention, the above-mentioned using process for the encrypted content is characterized by being a playback process for the content, and the above-mentioned content using step is characterized by performing the playback process for the content on condition that the playback process for the content is a playback process for the content permitted by a description of the usage right information read from the above-mentioned information recording medium.

Furthermore, in an embodiment of the information processing method of the present invention, the above-mentioned using process for the encrypted content is characterized by being an import process for the content, and the above-mentioned content using step is characterized by performing the import process for the content on condition that the import process for the content is an import process for the content permitted by a description of the usage right information read from the above-mentioned information recording medium, and importing the usage right information read from the above-mentioned information recording medium together with the content when performing the import process for the content.

Furthermore, in an embodiment of the information processing method of the present invention, the above-mentioned usage right information imported to the information processing apparatus is characterized by being usage right information describing usage conditions for the content that has been imported.

Furthermore, in an embodiment of the information processing method of the present invention, the above-mentioned usage right information is characterized by being information describing at least any of permission conditions for playing, checking out, or copying the content.

Furthermore, in an embodiment of the information processing method of the present invention, the above-mentioned information processing method is characterized by performing a verifying process for a MAC (Message Authentication Code) as data for verifying falsification of a media identifying data (PID: Post scribed-ID) read from the above-mentioned information recording medium, and performing use of the content on condition that the media identifying data (PID: Post scribed-ID) has been determined unfalsified.

Furthermore, in an embodiment of the information processing method of the present invention, the above-mentioned content using step is characterized by including a step of acquiring the content by decryption of the encrypted content file read from the above-mentioned information recording medium, while applying the encryption key information read from the above-mentioned information recording medium.

Furthermore, in an embodiment of the information processing method of the present invention, the encrypted content file stored on the above-mentioned information recording medium is characterized by being a file including encrypted content, an encrypted content key that is encrypted data on a content key as a decryption key for the above-mentioned encrypted content, and an enabling key block (EKB) as encrypted key data that can acquire keys applied to decryption of the above-mentioned encrypted content key, and the above-mentioned content using step is characterized by including a step of performing a process for the enabling key block (EKB) by acquiring a device node key (DNK) as key information applied to the process for the enabling key block (EKB) included in the above-mentioned encrypted content file, from the above-mentioned encryption key information.

Furthermore, a fourth aspect of the present invention is:
a computer program for performing a using process for encrypted content stored on an information recording medium, characterized by comprising:

a data reading step of reading:
an encrypted content file including encrypted content stored on an information recording medium,
usage right information corresponding to the above-mentioned encrypted content and stored on the above-mentioned information recording medium, and
encryption key information necessary for a decrypting process for the above-mentioned encrypted content and stored on the above-mentioned information recording medium,
from the information recording medium;
a usage right information confirming step of confirming use of the content permitted by a description of the usage right information read in the above-mentioned data reading step; and
a content using step of performing use of the content on condition that the use of the content is confirmed to be permitted by the description of the read usage right information, in the above-mentioned usage right information confirming step.

According to the configuration of the present invention, the information recording medium such as a CD stores an encrypted content file including encrypted content, usage right information of the encrypted content, and encryption key information necessary for a decrypting process for the encrypted content. Thus, a user can acquire a license (usage right information) and key information necessary for decryption of the content, together with the content, from the information recording medium, without acquiring the license (usage rights) by connection to a license provider. Therefore, it is no longer necessary to perform a process of acquiring the license (usage rights) from the license provider when the content is to be used, whereby user convenience is improved, and license-based content copyright management can also be ensured.

Furthermore, according to the configuration of the present invention, when the information processing apparatus performing use of an information recording medium having encrypted content stored thereon is to import the encrypted content to a storage means such as a hard disk within the information processing apparatus, the usage right information describing usage conditions for the content that has been imported is set and stored on the storage means such as a hard disk. Thus, use of the content that has been imported is limited according to the usage right information imported together with the content, and thus a reliable, license-based use of the content is implemented also for the content that has been imported.

Furthermore, according to the configuration of the present invention, a media identifying data (PID: Post scribed-ID) as an identifier unique to the information recording medium is stored on the information recording medium, and a MAC (Message Authentication Code) as data for verifying falsification is included for the PID. Thus, in addition to confirmation of usage rights based on the usage right information stored on the information recording medium, a usage permission is given on condition that the PID is not falsified through PID verification at the time the content is used, whereby a higher level of content usage management can be made possible.

Furthermore, according to the configuration of the present invention, the encrypted content file is a file including encrypted content, an encrypted content key that is encrypted data on a content key as a decryption key for the encrypted content, and an enabling key block (EKB) as encrypted key data that can acquire keys applied to decryption of the encrypted content key, and the encryption key information stored on the information recording medium is set as a device node key (DNK) as key information applied to a process for the enabling key block (EKB) included in the encrypted content file. Thus, by performing key management for the device node key (DNK), content usage management under a strict license control can be made possible.

Furthermore, according to the configuration of the present invention, the information recording medium includes a plurality of different forms of encrypted content files, which are an encrypted content file usable on the basis of a confirming process for usage rights according to the usage right information stored on the information recording medium, and an encrypted content file usable on the basis of a confirming process for usage rights according to the usage right information that is not stored on the information recording medium, but that can be acquired from a license provider. Thus, user convenience for using the content is realized, and an effect of promoting user access to a license provider is also realized.

Note that the computer program of the present invention is a computer program that can be provided by a storage medium, a communication medium, e.g., a storage medium such as a CD or an FD, an MO, or a communication medium such as a network, provided in a computer-readable form to, e.g., a general-purpose computer system that can execute various program codes. By providing such a program in a computer-readable form, processing according to the program is realized on the computer system.

Further objects, features and advantages of the present invention will become apparent from a more detailed description that is based on a later-described embodiment of the present invention and accompanying drawings. Note that the system used in the present specification means a logical set configuration of a plurality of apparatuses, and is not limited to one wherein apparatuses each having its own configuration are grouped within the same enclosure.

BRIEF DESCRIPTION OF THE DRAWINGS

FIG. 7 is a diagram showing example enabling key blocks (EKBs) used for distributing the various keys, data.

FIG. 14 is a diagram showing an example data configuration of service data, usage right information.

FIG. 15 is a diagram showing an example data configuration of usage right information.

FIG. 16 is a diagram showing an example data configuration of usage right information corresponding to imported content.

FIG. 17 is a diagram explaining a sequence of a playback and import process for content.

BEST MODES FOR CARRYING OUT THE INVENTION

An information recording medium, an information processing apparatus, an information processing method, and a computer program of the present invention will now be described in detail.

[1. Information Recording Medium]

Figure 1:
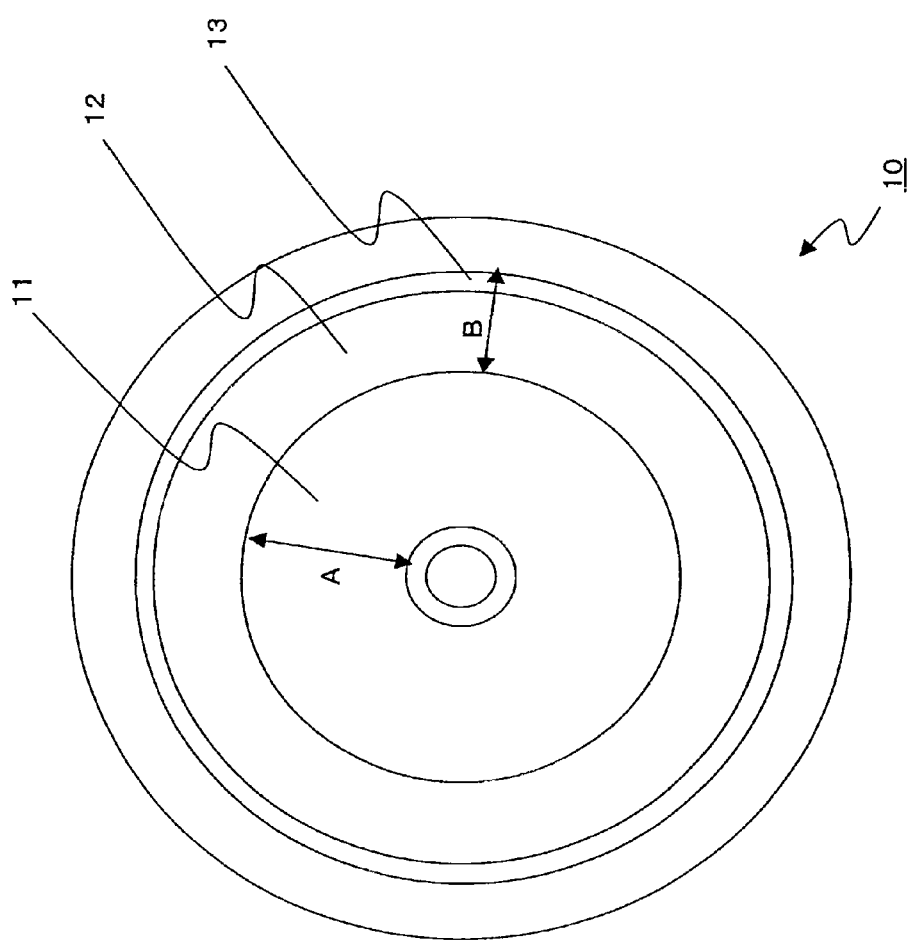
FIG. 1 is a diagram showing a configuration of an information recording medium having a first data storage area on which a copy protection process has been performed and a second data storage area on which no copy protection process has been performed.

First, referring to FIG. 1 et seq., an example data recording configuration of an information recording medium according to the present invention will be described. FIG. 1 shows a plan view of an information recording medium 10 representing various types thereof including a CD (Compact Disc), a DVD (Digital Versatile Disc), an MD (Mini Disk). The information recording medium is divided into two data recording areas.

Set to an inner circumferential part (A) of the disc-shaped information recording medium 10 is a copyright-protection enabled content data recording area, i.e., a first data recording field (1st session) 11 as a content recording field having a copy/ripping protection function. Furthermore, set to an outer circumferential part (B) of the information recording medium 10 is a second data recording field (2nd session) 12 on which encrypted content is recorded. Note that ripping means a duplicating process for data as digital data by which the quality of the original data can be maintained. When the ripped data is written to another CD-R or the like, a content CD of exactly the same quality as that of the original CD can be created. Further, the ripped data can be recorded as compressed data such as MP3 data, and also transmitted via a network.

Note that the configuration of the present invention relates to a data recording configuration for the second data recording field (2nd session) 12 and to processing for data recorded thereon. Thus, data on the first data recording field (1st session) may be set as data of an arbitrary format, and a configuration without the first data recording field may even be possible. However, in the following embodiment, a description will be given mainly of examples to which an information recording medium having a plurality of sessions such as shown in FIG. 1 is applied.

In part of the second data recording field 12, a PID (Postscribed-ID) recording area 13 is provided. A PID is data that includes a media ID given as an identifier (ID) unique to each disk by a predetermined disk set unit, such as a title unit, an album unit, a category unit, a production lot unit, and other data such as version information, and that is further appended with a MAC (Message Authentication Code) as a code for verifying data falsification. A detailed configuration of the PID will be described later.

As shown in FIG. 1, the information recording medium 10 is an information recording medium to which set are the first data storage area (1st session) 11 that is set as a content storage area with a copy protection process performed thereon, and the second data storage area (2nd session) 12 that stores encrypted content, license information including usage right information (usage right) of the encrypted content, and encrypted key data necessary for acquiring keys applied to a decrypting process for the encrypted content.

Note that one session is a unit area comprising a lead-in area constituted by a data area (e.g., silent data) indicative of a data starting area, a content storage area, and a lead-out area indicative of a data ending area. The information recording medium 10 shown in FIG. 1 is a recording medium that has a multi-session configuration wherein two sessions are recorded.

Figure 2:
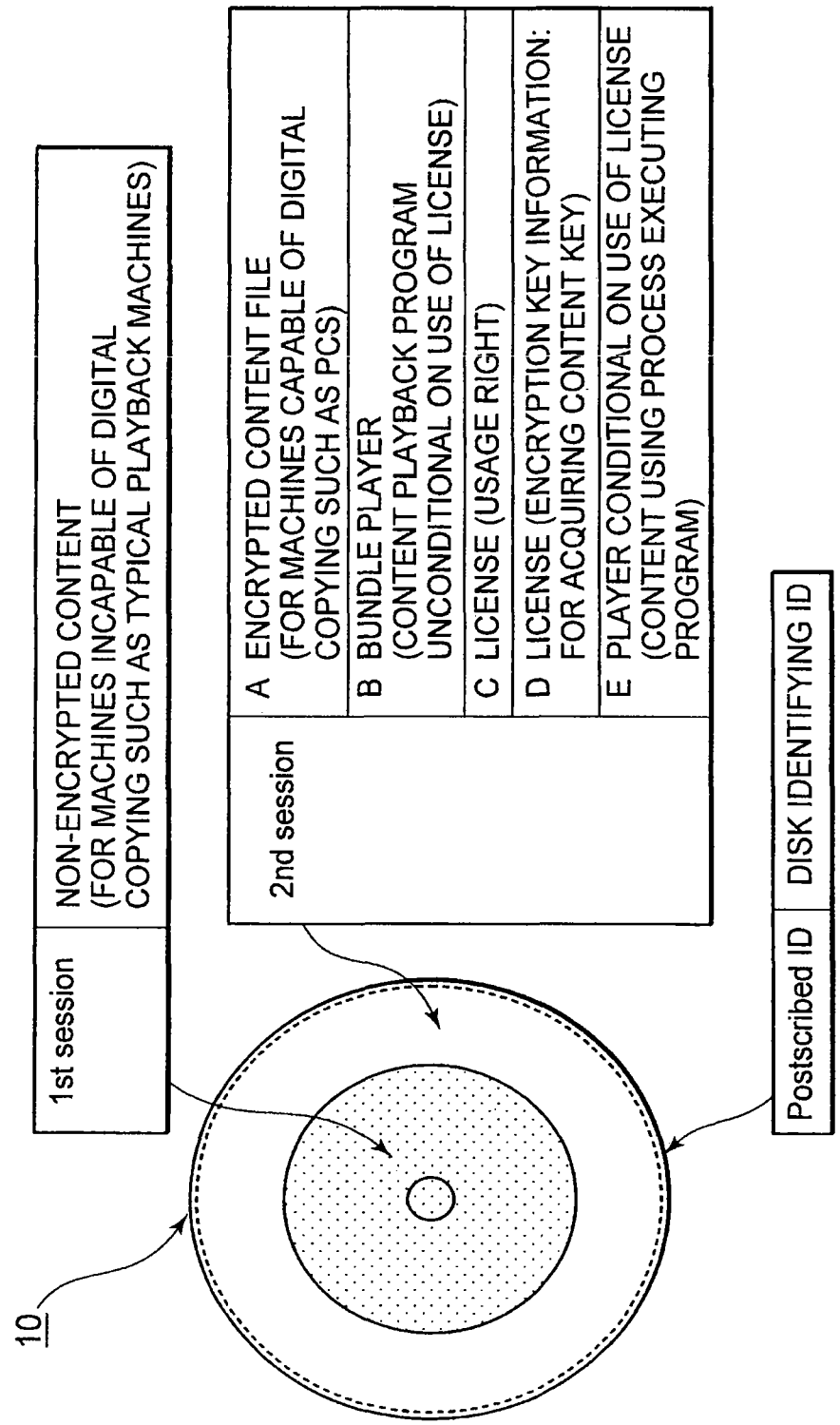
FIG. 2 is a diagram explaining a data configuration of the information recording medium.

Referring to FIG. 2, details of the data stored on the information recording medium 10 will be described. The content recorded on the first data recording field (1st session) has the copy protection process performed thereon. For example, the information recording medium 10 is configured such that a false signal is recorded on its first track to prevent a PC from recognizing it as a music CD when the medium is set to a PC's CD-ROM drive whereby to prohibit a PC's music CD playback processing program from performing a playback process. Various copy protection functions may be applicable, including, e.g., copy control technology developed by Midbar Tech Ltd. or copy control technology developed by Macrovision Corporation, U.S.

The recorded content of the first data recording field (1st session) is set in a content recording field for preventing the ripping process, the copying process, such as, e.g., reading its recorded content as digital data for storage on another recording medium, or for conversion into compressed data such as MP3 data when being attached to, e.g., the CD drive of the PC or the like.

The content recorded on the first recording field (1st session) can be played by a playback processing apparatus (player) having a playback function as its dedicated function, such as a typical CD player. That is, even when a false signal is recorded on the first track, a CD player capable of performing only playback of a CD having no copying or ripping processing program still can play the content data, neglecting that signal.

On the other hand, stored on the second data recording field (2nd session) are:

A. Encrypted content file
B. Bundle player
C. Usage right information (license information)
D. Encryption key information
E. Player conditional on the usage right information (license information) being applied Each of these data will be described below.

A. Encrypted Content File

The encrypted content file is content for a playback apparatus capable of performing a digital copying process, such as a PC, and can be played by performing a decrypting process to which an encryption key (content key) pre-set so as to correspond to the content is applied. The encryption key (content key) for performing the decrypting process may be acquired on condition that a license corresponding to the content is acquired. In a configuration of the present invention, license information is stored on the second data recording field (2nd session) of the information recording medium together with the encrypted content file, and thus this stored license can be used, and hence there is no need to acquire the license by connecting to a license provider via a network such as the Internet.

For example, keys applied to decryption of an enabling key block (EKB) included in the encrypted content file are acquired based on the license information, and the content key is acquired based on the acquired keys, whereby the encrypted content can be decrypted with the content key. Note that details of a key acquiring process by a decrypting process for the enabling key block (EKB) will be described later.

B. Bundle Player

The bundle player is a program for performing a direct playback process not involving import of the encrypted content stored on the 2nd session. This is a program that can be utilized by setting the information recording medium 10 to the PC, and that performs a playback process not involving a copying, i.e., import process to another recording medium such as a HDD of the PC or the like, i.e., a direct playback process from the information recording medium 10 such as a CD.

C. Usage Right Information (License Information)

The usage right information is information that permits use of the encrypted content, and includes various content usage right information, such as content usage conditions, e.g., content playback permission information, copying permission information, content import process permission information, content check-out permission information, CD-R burn permission information, and their maximum count information. When the encrypted content is imported (copied) to the PC or the like, the license is imported (copied) together. The content and its license recorded on the HDD or the like of the PC can be copied further to a flash memory or the like. At the time of use of the content, whether or not such use of the content satisfies a content usage condition stored in the license is always verified, and only when the content usage condition is satisfied, the use of the content, i.e., processing such as playback, copying, of the content becomes executable.

Descriptions of the usage right information include, for example:

whether or not offline-import of a license (usage right information) is permitted;
Whether or not online import of a license (usage right information) is permitted;
Whether or not playback (play) of content is permitted, maximum count, time limit, permitted device attributes;
Whether or not move (move) of content is permitted, maximum count, time limit, permitted device attributes;
Whether or not check-out of content is permitted, maximum count, time limit, permitted device attributes; and
Whether or not CD-R burning by copying content is permitted, maximum count.

Note that the offline import of a license (usage right information) means a process of importing a license (usage right information) corresponding to encrypted content stored on an information recording medium from the information recording medium to a recording medium such as a hard disk of an information processing apparatus such as a PC, and the online import of a license (usage right information) means a process of acquiring the license (usage right information) corresponding to the encrypted content not from the information recording medium, but via a network by accessing a license provider.

The encrypted content stored on the information recording medium is available in two forms: with its content usage right information stored and not stored, together therewith. When not stored, the content usage right information is acquired via a network by accessing a license provider.

Further, the check-out means a process of temporarily outputting content stored on, e.g., a PC to other devices, such as portable media (PM). A process of returning the content from the PM to the PC is called check-in.

At the time the encrypted content is used, a user device such as a PC interprets the usage right information at a usage right information interpreting module within the user device, and uses the content on condition that the user device conforms to a usage condition.

D. Encryption Key Information

The encryption key information is information necessary for acquiring a content key that decrypts the encrypted content, or keys applied to decryption of an encrypted content key obtained by encrypting the content key.

The user device such as a PC acquires keys applied to decryption of the encrypted content key, e.g., on condition that the user device itself has been determined to conform to a usage condition described in the usage right information (license). A content key acquiring process is performed by decrypting the encrypted content key using the acquired keys, and the encrypted content is decrypted on the basis of the acquired content key to perform a process of using the content, such as playing the content, or copying, moving the content to another device.

The encryption key information is a device node key (DNK) provided by, e.g., a hierarchical key distribution configuration. The content key can be acquired by processing, such as decrypting an enabling key block (EKB) included in the encrypted content file based on the device node key (DNK).

Details of provision of the device node key (DNK) by the hierarchical key distribution configuration, and the key acquiring process by the decrypting process for the device node key (DNK)-based enabling key block (EKB) will be described later.

E. Player Conditional on the Usage Right Information (License Information) being Applied The player conditional on the usage right information (license information) being applied is a content using process performing program that executes control over the whole content using process when the content is to be used on the basis of a license, such as the encrypted content being played, copied. A description will be given later of specific descriptions in the usage right information (license information), and use of content based on the usage right information (license information).

The information recording medium is further provided with the PID (Postscribed-ID) recording area in part of the second data recording field. The PID is data that includes a media ID given as an identifier (ID) unique to each disk by a predetermined disk set unit, such as a title unit, an album unit, a category unit, a production lot unit, and other data such as version information, and that is appended with a MAC (Message Authentication Code) as a code for verifying data falsification.

Figure 3:
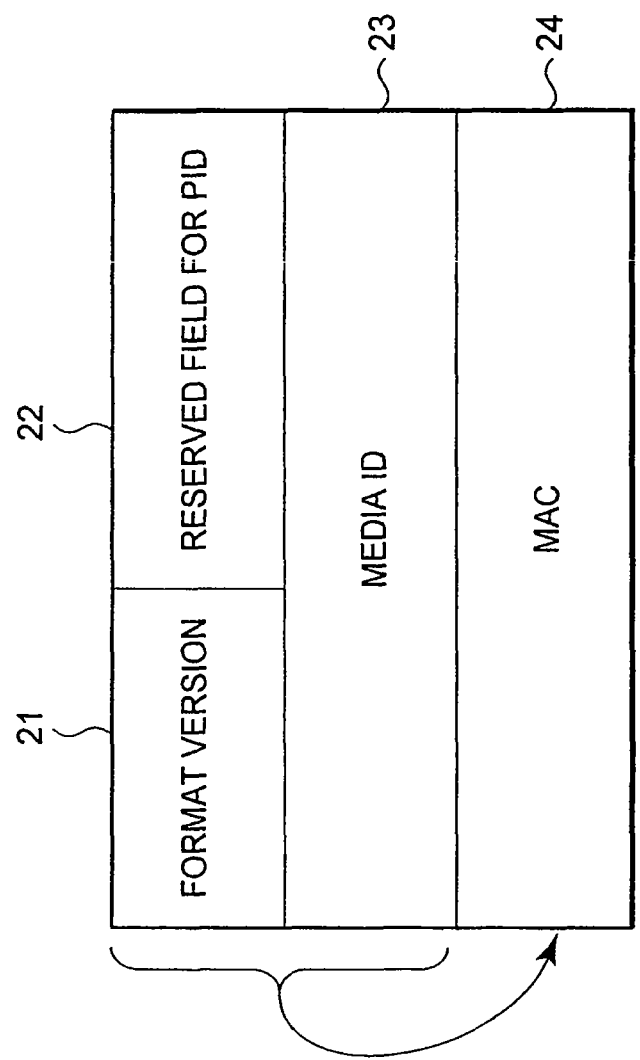
FIG. 3 is a diagram showing an example format of PID data.

FIG. 3 shows an example data configuration of a PID. The PID includes a format version 21 indicative of a format version of the PID, a PID reserved field 22, a media ID 23 as an identification data unique to each disk, with a MAC 24 appended for these data as a code for verifying their falsification.

Figure 4:
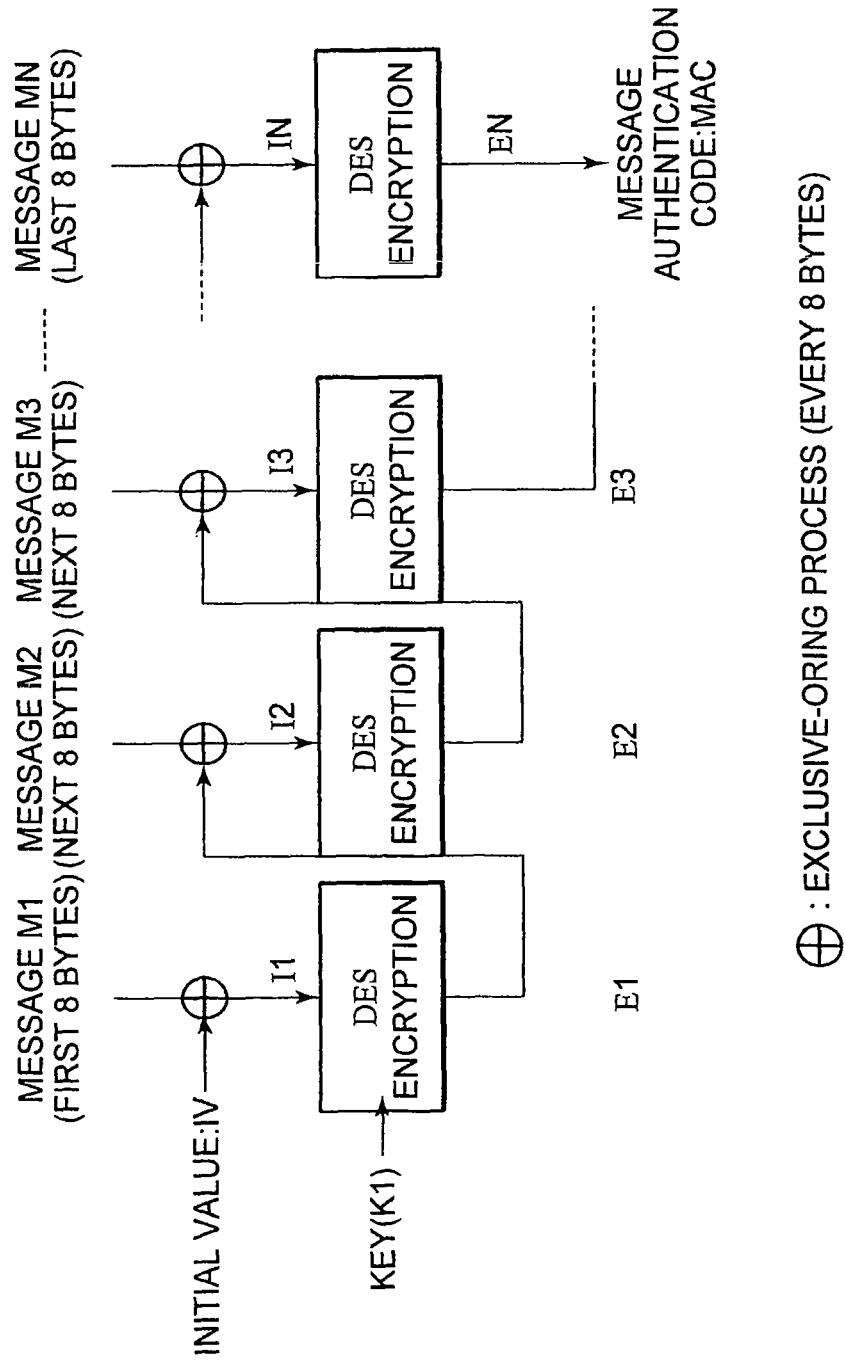
FIG. 4 is a diagram showing an example MAC value generating process.

The message authentication code (MAC) is generated as data for verifying falsification of data. Although there could be various processing forms of a MAC generating process and a verifying process, an example of MAC value generation using a DES encryption processing configuration is shown in FIG. 4.

The example of MAC generation shown in FIG. 4 to which the DES encryption processing configuration is applied will be described. A subject message is divided into 8-byte units (the divided message segments will hereinafter be M1, M2, ..., MN). First, an initial value (hereinafter an IV) is exclusive-ORed with the M1 (a result of which will be an I1). Next, the I1 is entered into a DES encrypting section for encryption using a key (hereinafter a K1) (an output of which will be an E1). Successively, the E1 is exclusive-ORed with the M2, and an output thereof I2 is entered into the DES encrypting section for encryption using the key K1 (an output E2). This operation is thereafter repeated to perform the encrypting process on all the message segments. The last output EN becomes the message authentication code (MAC).

The MAC value takes a different value when its generation source data is changed. A MAC generated based on data (message) for verification is compared with a recorded MAC, and if they match, the data (message) for verification is proved to be unchanged and unfalsified.

Figure 5:
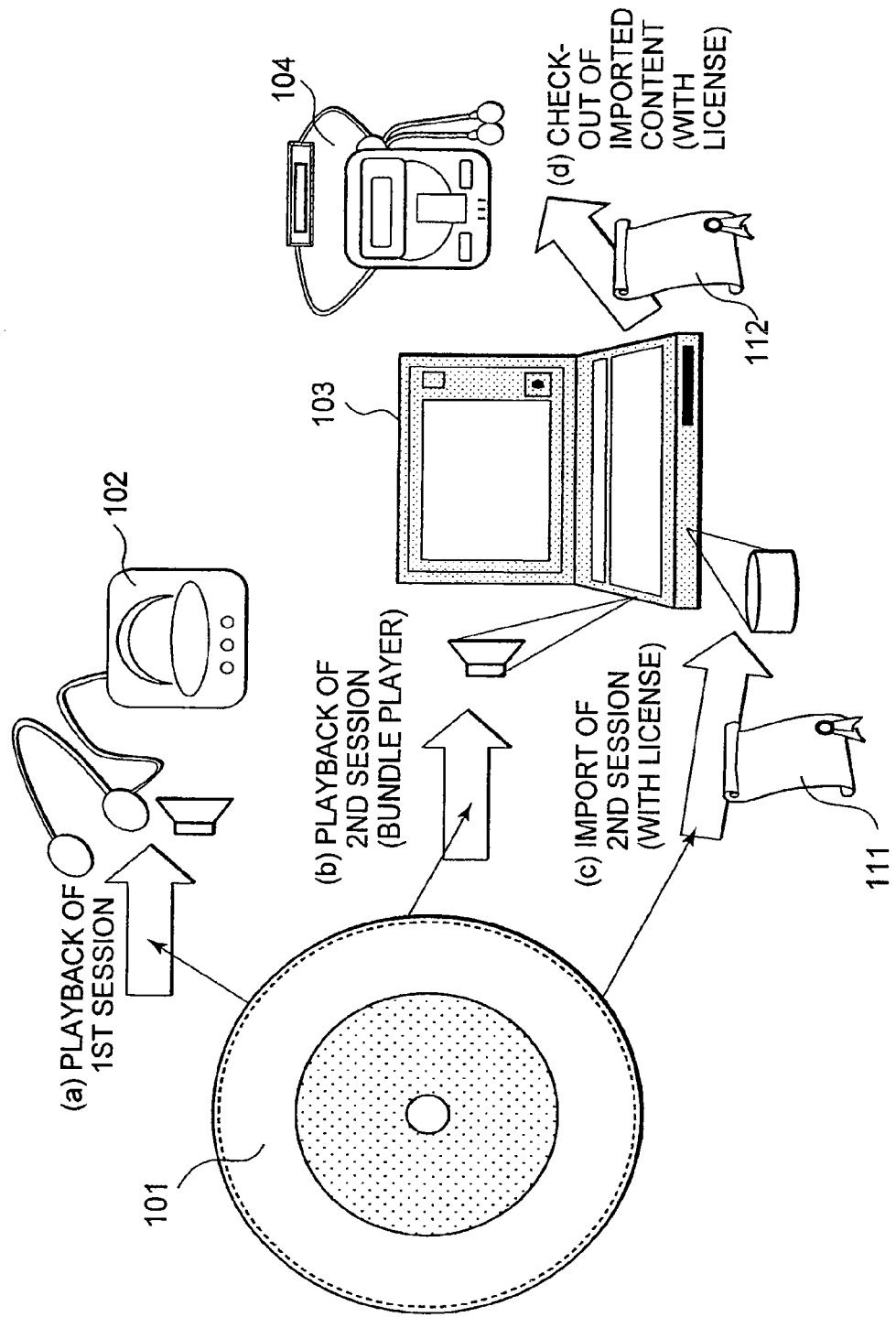
FIG. 5 is a diagram explaining how the information recording medium is used.

Referring to FIG. 5, how the information recording medium is used will be described. It is possible for an information recording medium 101 (*a*) to play content recorded on the 1st session in playback equipment incapable of digital copying such as ripping, e.g., a CD player 102. Further, it is possible for the information recording medium 101 (*b*) to directly play content recorded on the 2nd session using the bundle player recorded on the 2nd session in equipment capable of digital copying such as ripping, e.g., a PC 103.

Furthermore, in the PC 103, it is possible (c) to import the content recorded on the 2nd session, i.e., to copy the encrypted content to a recording device such as a hard disk within the PC 103. However, this is executable when conforming to a usage condition described in usage right information (license) recorded on the 2nd session; the import process can be performed on condition that a user device such as the PC 103 causes a usage right information interpreting module within the user device to interpret the usage right information, and that the process to be performed conforms to a usage condition. For example, if the content is importable by a usage condition in the license, the import process can be performed. If, however, the content is not importable, the import process is not performed.

Further, in a case where the encrypted content is to be imported, a license 111 including the usage right information is also imported and then stored on a recording medium of the PC 103 together with the encrypted content. In a case where the PC 103 uses, e.g., plays, copies, moves, or checks out, the imported content, the PC interprets the imported usage right information in the license, to perform use of the content conditional on such use conforming to a usage condition.

The imported content can further be checked out to, e.g., a flash memory usable in a portable device 104, and the checked-out content stored on the flash memory can be used, e.g., played in the portable device 104. However, in this case as well, the check-out is executable on condition that the PC 103 interprets the usage right information in the imported license and that the check-out process to be performed conforms to a usage condition. Note that the license is stored on the flash memory also at the time of the check-out process, so the portable device 104 interprets the usage right information in the license to perform use of the content on condition that the check-out process to be performed conforms to a usage condition.

[2. Hierarchical Key Distribution Configuration]

Next, device and key management by a tree structure will be described, which configuration is one form of a broadcast encryption system for allowing only a client having legitimate content usage rights to use content.

Figure 6:
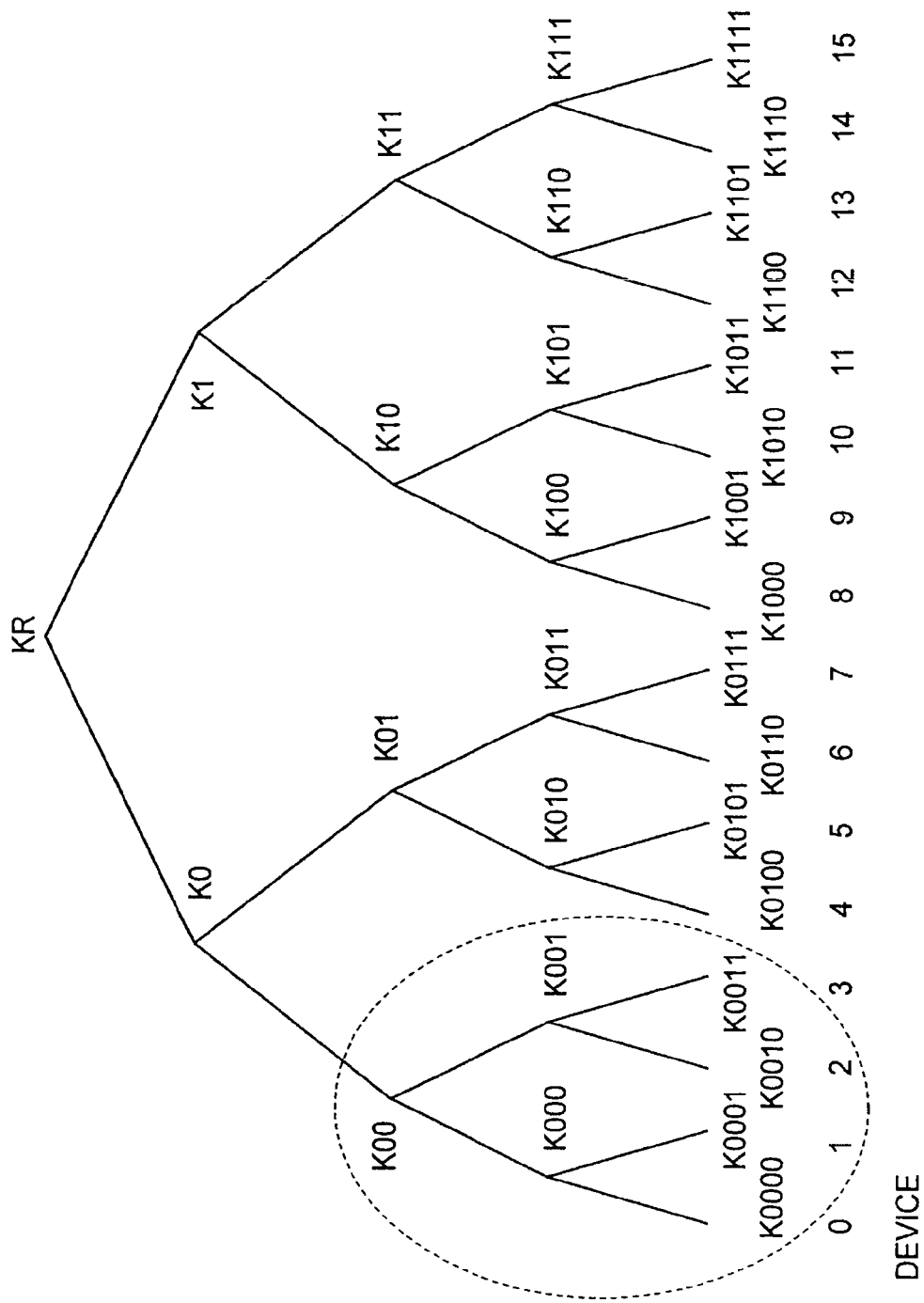
FIG. 6 is a tree structure diagram explaining an encrypting process, a distributing process for various keys, data.

Numerals 0 to 15 shown at the lowermost stage in FIG. 6 denote user devices as clients who use content. That is, each leaf in a hierarchical tree structure shown in FIG. 6 corresponds to each of the devices.

Each of the devices 0 to 15 stores a key set (device node key (DNK)) in a memory at the time of fabrication or shipment, or thereafter. The key set comprises keys (node keys) allocated to nodes from its own leaf to the root, and the leaf key of each of the leaves in the hierarchical tree structure shown in FIG. 6. Reference characters K0000 to K1111 shown at the lowermost stage of FIG. 6 denote the leaf keys respectively allocated to the devices 0 to 15, and the node keys are denoted by keys KR to K111 extending from a root key KR at the uppermost stage to the nodes at the second stage from the lowermost stage.

In the tree structure shown in FIG. 6, for example, the device 0 owns the leaf key K0000 and the node keys K000, K00, K0, KR. The device 5 owns K0101, K010, K01, K0, KR. The device 15 owns K1111, K111, K11, K1, KR. Although only 16 devices 0 to 15 are shown in the tree of FIG. 6 and the tree structure is shown as a symmetrical four-stage configuration, the tree may have more devices and a different stage configuration.

Further, the devices in the tree structure of FIG. 6 include those using various types of recording media, such as a DVD, a CD which are embedded in or releasable from a device, an MD, a flash memory. Furthermore, various application services may co-exist. Thus, the hierarchical tree structure shown in FIG. 6, which is a content or key distribution configuration, is applied to the co-existence of different devices and applications.

In the system wherein such various devices and applications co-exist, e.g., a portion surrounded by the dotted line in FIG. 6, i.e., the devices 0, 1, 2, 3 are set as one group using the same recording medium. For example, for the devices included in the group surrounded by the dotted line, processing is performed, which includes, transmitting content common thereto from a provider after encryption, transmitting a content key used in common by the devices, or outputting content fee payment data to the provider, a settlement institution, or the like from the devices also after encryption, collectively. This enables an entity exchanging data with each of the devices, such as a content server, a license server, or a shop server to perform a process of collectively transmitting data to the portion surrounded by the dotted line of FIG. 6, i.e., the devices 0, 1, 2, 3 as one group. A plurality of such groups are present in the tree of FIG. 6.

Note that the node keys and the leaf keys may be configured to be managed in a supervised manner by a management system having a key management center function, or on a group basis by message data distributing means of a provider, a settlement institution, or the like that exchanges various data with each of the groups. These node keys and leaf keys are subjected to a renewal process when, e.g., leaked, and this renewal process is performed by the management system having a key management center function, the provider, the settlement institution, or the like.

As is apparent from FIG. 6, in this tree structure, the 3 devices 0, 1, 2, 3 included in one group hold device node keys (DNK) each including common keys K00, K0, KR as their device node keys (DNK). By utilizing this node key sharing configuration, e.g., a common key can be provided only to the devices 0, 1, 2, 3. For example, the node key K00 commonly held is a holding key common to the devices 0, 1, 2, 3. Further, if a value Enc(K00, Knew) obtained by encrypting a new key Knew with the node key K00 is distributed to the devices 0, 1, 2, 3 via a network or after storage on a recording medium, only the devices 0, 1, 2, 3 can decode the encryption Enc(K00, Knew) using the shared node key K00 held at the respective devices to acquire the new key Knew. Note that Enc(Ka, Kb) represents data obtained by encrypting Kb with Ka.

Further, when it is found, at a time t, that the keys K0011, K001, K00, K0, KR owned by the device 3 have been analyzed and revealed by an attacker, it is necessary to sever the device 3 from the system thereafter in order to protect data exchanged within the system (the group consisting of the devices 0, 1, 2, 3). In order to do so, it is necessary to renew the node keys K001, K00, K0, KR to new keys K(t)001, K(t)00, K(t)0, K(t)R, and inform the devices 0, 1, 2 of the renewed keys. Here, K(t)aaa represents a renewed key of a key Kaaa of the "t"-th generation.

A distributing process for the renewed keys will be described. Renewal of keys is performed by supplying the devices 0, 1, 2 with a table constituted by block data called an enabling key block (EKB) shown in, e.g., FIG. 7 (A), via, e.g., a network or after storage on a recording medium. Note that the enabling key block (EKB) comprises encrypted keys for distributing newly renewed keys to devices corresponding to leaves constituting a tree structure such as shown in FIG. 6. The enabling key block (EKB) may sometimes be called a key renewal block (KRB).

The enabling key block (EKB) shown in FIG. 7 (A) comprises block data having such a data configuration as to be renewable only by devices, the node keys of which need be renewed. The examples shown in FIG. 7 are block data formed in order to distribute "t"-th generation renewed node keys, to the devices 0, 1, 2 in the tree structure shown in FIG. 6. As is apparent from FIG. 6, the device 0, the device 1 needs K(t)00, K(t)0, K(t)R as their renewed node keys, and the device 2 needs K(t)001, K(t)00, K(t)0, K(t)R as its renewed node keys.

As shown by the EKB of FIG. 7 (A), the EKB includes a plurality of encrypted keys. An encrypted key at the lowermost stage is Enc(K0010, K(t)001). This is a renewed node key K(t)001 encrypted by the leaf key K0010 owned by the device 2, and the device 2 decrypts this encrypted key with its own leaf key, whereby it can obtain K(t)001. Further, using K(t)001 obtained by the decryption, it can decrypt the encrypted key Enc(K(t)001, K(t)00) at the second stage from the bottom of FIG. 7 (A), whereby it can obtain a renewed node key K(t)00. Thereafter, it decrypts an encrypted key Enc(K(t)00, K(t)0) at the second stage from the top of FIG. 7 (A) to obtain a renewed node key K(t)0, and decrypts an encrypted key Enc(K(t)0, K(t)R) at the topmost stage of FIG. 7 (A) to obtain K(t)R, in sequence. On the other hand, the devices K0000, K0001 do not include the node key K000 for renewal, but need K(t)00, K(t)0, K(t)R as their renewed node keys. The devices K0000, K0001 decrypt an encrypted key Enc(K000, K(t)00) at the third stage from the top of FIG. 7 (A) to obtain K(t)00, and thereafter decrypt an encrypted key Enc(K(t)00, K(t)0) at the second stage from the top of FIG. 7 (A) to obtain a renewed node key K(t)0, and decrypt an encrypted key Enc(K(t)0, K(t)R) at the topmost stage of FIG. 7 (A) to obtain K(t)R. In this way, the devices 0, 1, 2 can obtain the renewed key K(t)R. Note that the indexes in FIG. 7 (A) represent the absolute addresses of node keys, leaf keys used as decryption keys.

In a case where the node keys K(t)0, K(t)R at the upper stages in the tree structure shown in FIG. 6 need not be renewed, but only the node key K00 need be renewed, an enabling key block (EKB) of FIG. 7 (B) is used, whereby the renewed node key K(t)00 can be distributed to the devices 0, 1, 2.

The EKB shown in FIG. 7 (B) is usable, e.g., in a case where a new content key shared in a particular group is to be distributed. As a specific example, let it be assumed that the devices 0, 1, 2, 3 in the group shown by the dotted line in FIG. 6 use a recording medium and need a new common content key K(t)con. At this time, data Enc(K(t), K(t)con) obtained by encrypting the new, common renewed content key K(t)con, using K(t)00 obtained by renewing the node key K00 common to the devices 0, 1, 2, 3 is distributed together with the EKB shown in FIG. 7 (B). This distribution permits the data to be distributed as data undecryptable by equipment in other groups, such as the device 4.

That is, the devices 0, 1, 2 can obtain a key at the time t, e.g., the content key K(t)con applied to encryption/decryption of the content, as long as they decrypt the above-mentioned cipher text using K(t)00 obtained by processing the EKB.

Figure 8:
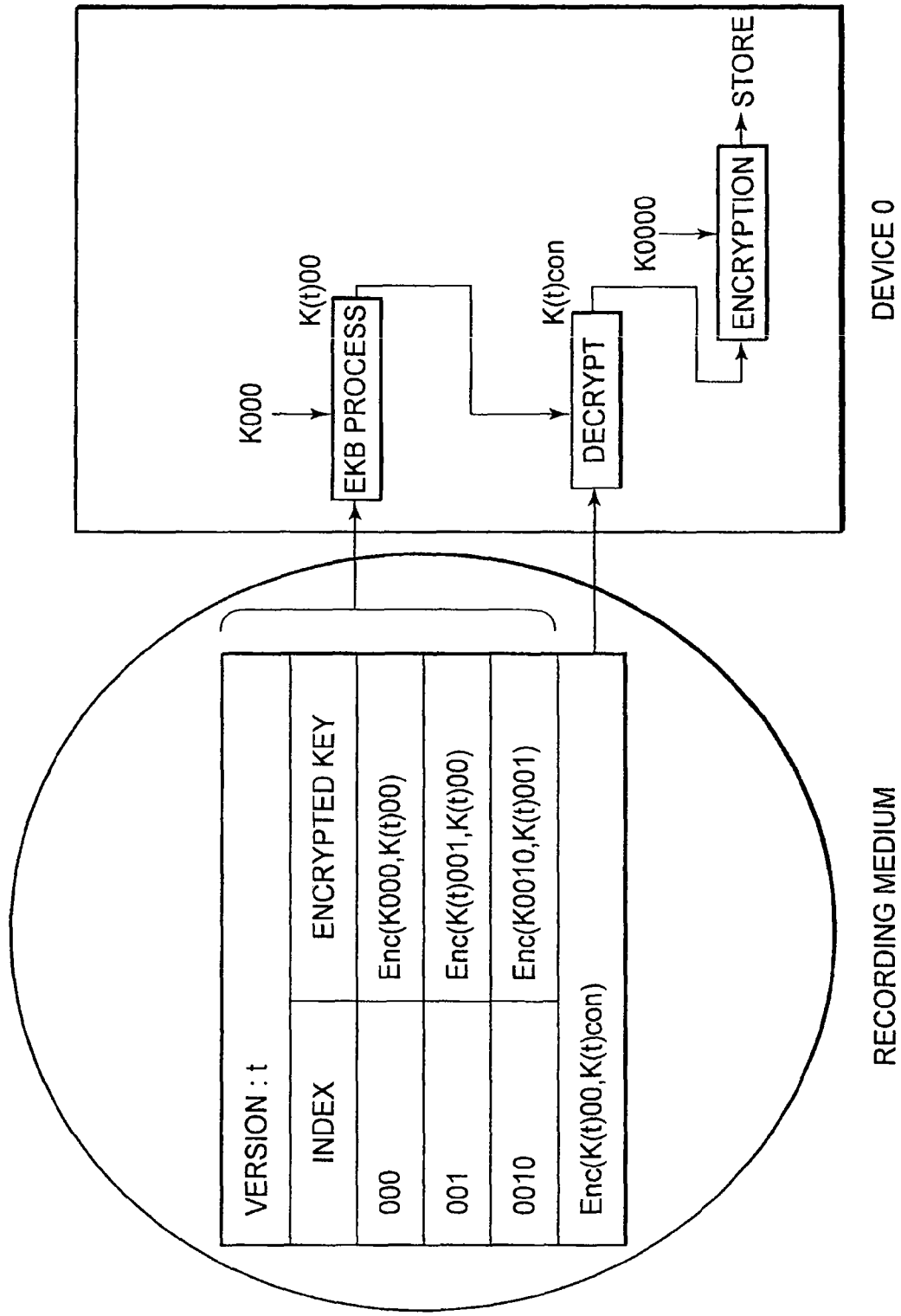
FIG. 8 is a diagram showing an example distributing process, an example decrypting process using an enabling key block (EKB) for a content key.

As an example of a process of obtaining, e.g., the content key K(t)con applied to encryption/decryption of the content, an example process performed by the device 0 is shown in FIG. 8, the device 0 having received the data Enc(K(t)00, K(t)con), which is obtained by encrypting the new common content key K(t)con using K(t)00, together with the EKB shown in FIG. 7 (B) via a recording medium. That is, this is an example in which the message data encrypted by the EKB is the content key K(t)con.

As shown in FIG. 8, the device 0 generates the node key K(t)00 through an EKB process similar to that mentioned above, using the EKB at the time of "t"-th generation stored on the recording medium and the node key K000 stored on itself beforehand. Furthermore, it decrypts the renewed content key K(t)con, using the decrypted renewed node key K(t)00, and stores it for use at a later time, after encryption using its own unique leaf key K0000.

Figure 9:
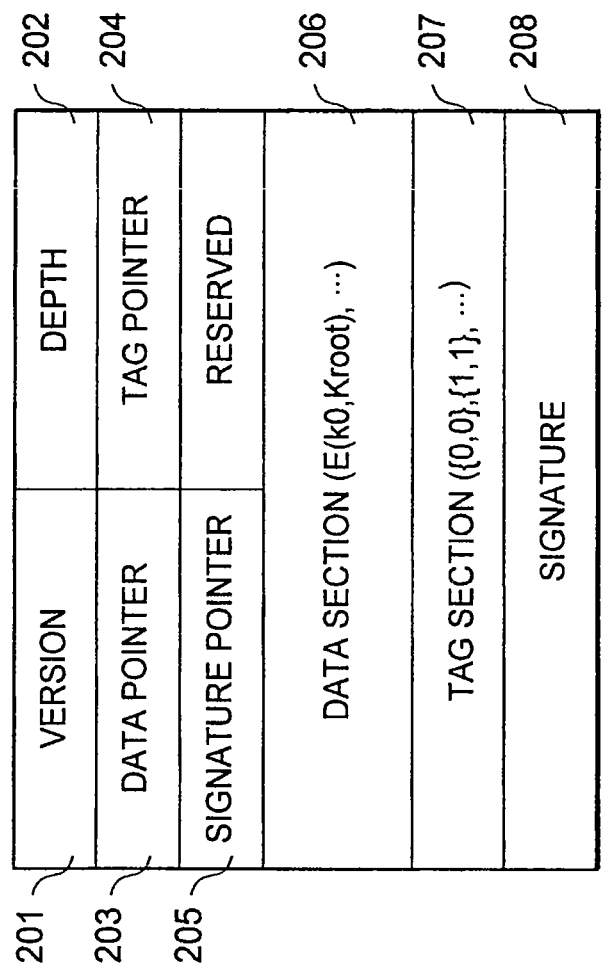
FIG. 9 is a diagram showing an example format of an enabling key block (EKB).

In FIG. 9 there is shown an example format of an enabling key block (EKB). A version 201 is an identifier indicative of the version of the enabling key block (EKB). Note that the version has a function of identifying the latest EKB and a function of indicating its correspondence to content. A depth indicates the number of stages of a hierarchical tree for devices to which the enabling key block (EKB) is distributed. A data pointer 203 is a pointer indicative of the position of a data section in the enabling key block (EKB). A tag pointer 204 is a pointer indicative of the position of a tag section. A signature pointer 205 is a pointer indicative of the position of a signature.

The data section 206 stores data obtained by encrypting, e.g., node keys for renewal. Stored therein are encrypted keys relating to renewed node keys such as shown in, e.g., FIG. 7.

Figure 10:
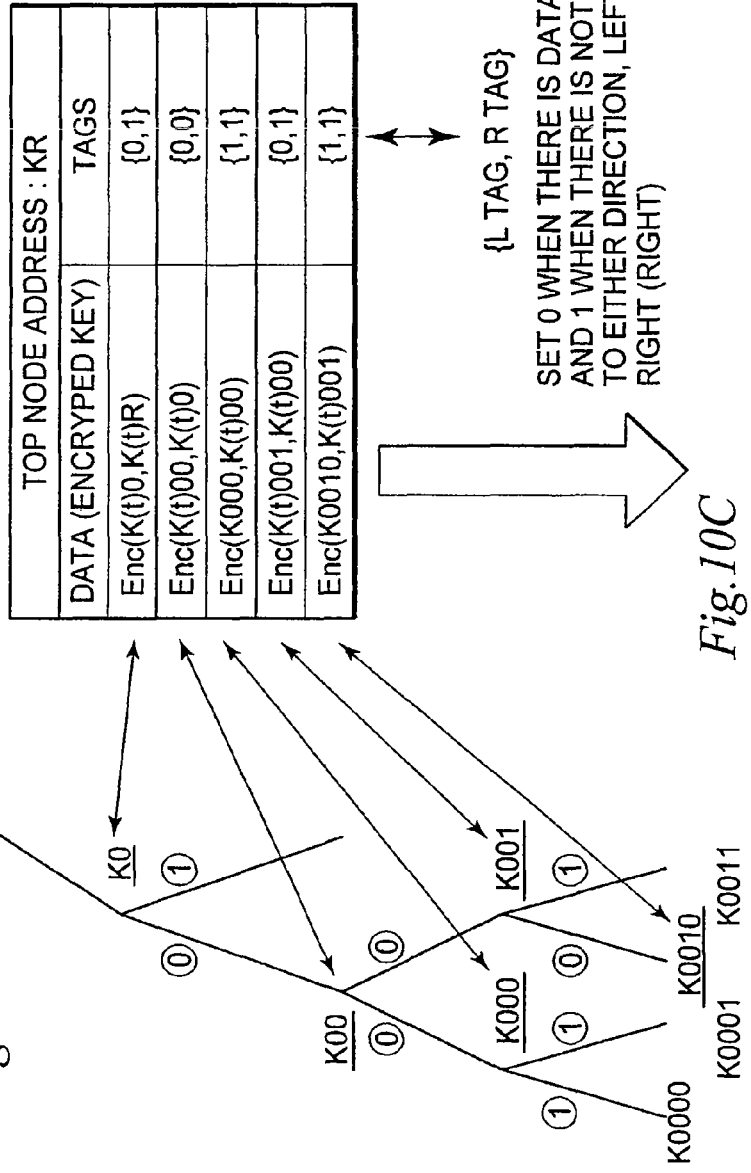
FIG. 10 is a diagram explaining a configuration of tags of the enabling key block (EKB).

The tag section 207 includes tags indicative of the positional relationship between encrypted node keys, leaf keys stored in the data section. Referring to FIG. 10, a rule for the tagging will be described. FIG. 10 shows an example in which the enabling key block (EKB) described earlier with reference to FIG. 7 (A) is transmitted as data. The data at this time is as shown in a table (b) of FIG. 10. The address of a top node included in the encrypted keys at this time is supposed to be a top node address. In this case, since the renewed key K(t)R for the root key is included, the top node address is KR. At this time, e.g., data Enc(K(t)0, K(t)R) at the uppermost stage is located at a position shown in a hierarchical tree shown in FIG. 10 (a). Here, the next data, which is Enc(K(t)00, K(t)0), is located at a lower left position of the previous data in the tree. If there is data, 0 is set to a tag, and if not, 1 is set. Tags are set as {left (L) tag, right (R) tag}. Since there is data on the left of the data Enc(K(t)0, K(t)R) at the uppermost stage, L tag=0. Since there is not data on its right, R tag=1. Thereafter, tags are set to all the data, to form a data string and a tag string shown in FIG. 10 (c).

Tags are set in order to indicate where in a tree structure data Enc(Kxxx, Kyyy) is positioned. The key data Enc(Kxxx, Kyyy) ... stored in the data section are merely an enumeration of encrypted key data, and thus the above-mentioned tags are employed to make identifiable the positions in the tree of the encrypted keys stored as data. Instead of using the above-mentioned tags, node indexes may be used which are made to correspond to the encrypted data as in the configuration described with reference to FIG. 7 above, to form, e.g., the following data configuration:

0: Enc(K(t)0, K(t)root)
00: Enc(K(t)00, K(t)0)
000: Enc(K((t)000, K(T)00)
.... However, this configuration using indexes would make the data redundant and large in volume, and thus would not be preferable for distribution or the like via a network. In contrast, by using the above-mentioned tags as index data indicative of key positions, the key positions can be identified using a small volume of data.

Returning to FIG. 9, the EKB format will further be described. The signature 208 is a digital signature executed by, e.g., a management system having a key management center function, a content server, a license server, a shop server, or the like having issued the enabling key block (EKB). A device having received the EKB confirms through signature verification that the enabling key block (EMB) has been issued by a legitimate enabling key block (EKB) issuer.

A configuration will be described below, which is for performing efficient key renewing process, encrypted key distribution, data distribution by classifying a hierarchical tree structure defining node keys and the like into device categories.

Figure 11:
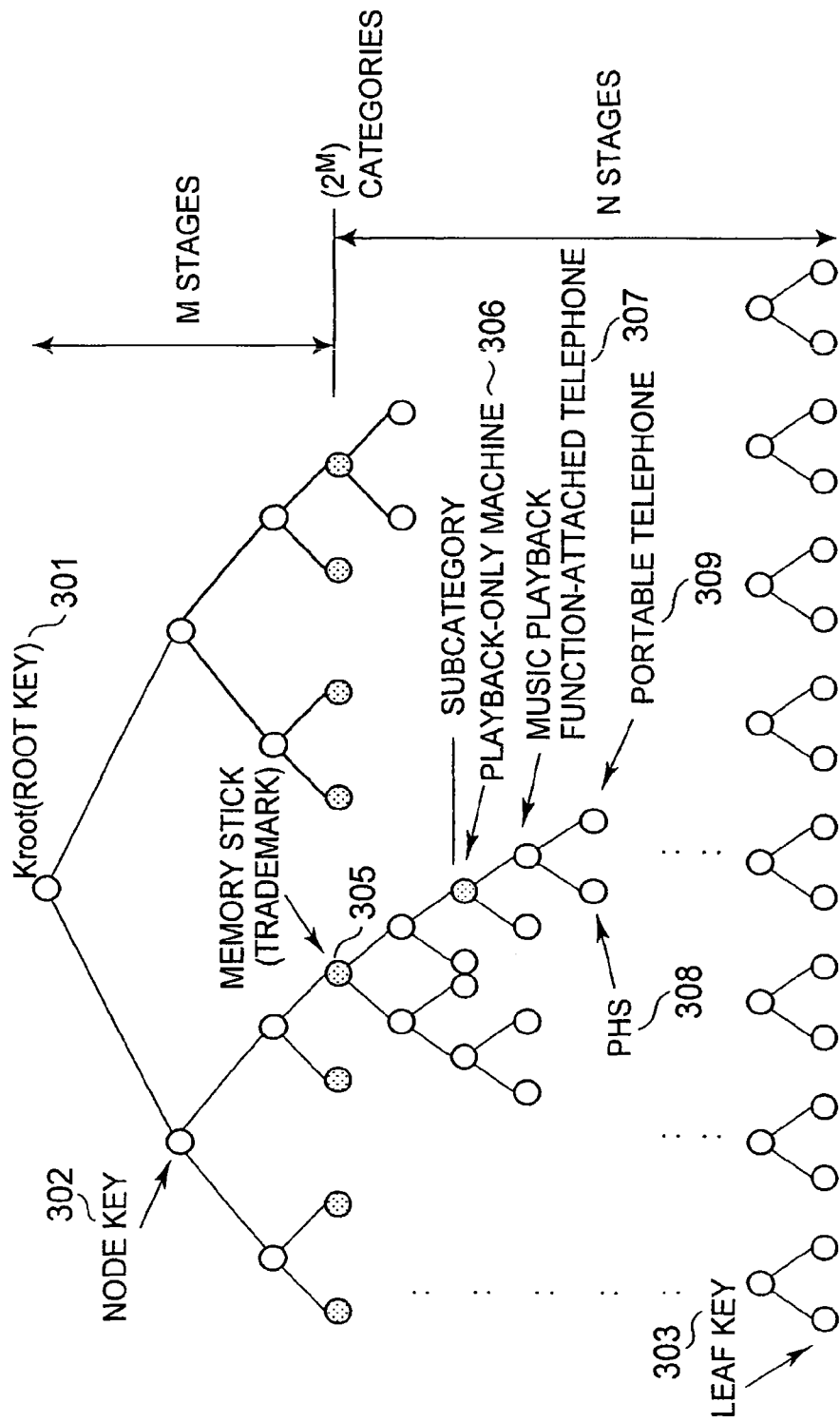
FIG. 11 is a diagram explaining categorization in a tree structure.

In FIG. 11 there is shown an example categorization of a hierarchical tree structure. In FIG. 11, a root key Kroot 301 is set at the uppermost stage of the hierarchical tree structure; therebelow, a node key 302 is set at an intermediate stage, and a leaf key 303 is set at the lowermost stage. Each of devices holds its own leaf key, a series of node keys from the leaf key to the root key, and the root key.

Here, a node at an M-th stage from the uppermost stage is set as a category node 304, as an example. That is, each of the nodes at the M-th stage is set to be a device setting node for a particular category. With one of the nodes at the M-th stage as an apex, nodes, leaves at the "M+1"-th and subsequent stages are set to be nodes, leaves relating to devices included in that category.

For example, a category [memory stick (trademark)] is set to a node 305 at the M-th stage of FIG. 11. Nodes, leaves concatenated to this node are set as nodes or leaves dedicated to the category including various devices using a memory stick. That is, the node 305 et seq. are defined as a set of nodes and leaves relating to devices defined in the category of memory stick.

Furthermore, a stage that is some stages below the M-th stage can be set as a subcategory node 306. For example, as shown in the figure, a [playback-only machine] node is set at a node two stages below the category [memory stick (trademark)] node 305, as a subcategory node included in the category of devices using a memory stick (trademark). Furthermore, below the playback-only machine node 306 that is a subcategory node, a music playback function-provided telephone node 307 included in the category of playback-only machine can be set, and a [PHS] node 308 and a [portable telephone] node 309 included in the category of music playback function-provided telephone can be set further therebelow.

Furthermore, categories, subcategories can be set not only by the type of device, but also by, e.g., the node independently managed by a certain maker, a content provider, a settlement institution or the like, i.e., by an arbitrary unit such as a processing unit, a jurisdictional unit, or a provided service unit (hereinafter collectively called an entity). For example, if a category node is set as an apex node dedicated to a game machine XYZ sold by a game machine maker, then the maker can sell the game machine XYZ after storage of node keys, leaf keys at stages below that apex node. Thereafter, distribution of encrypted content, or a distributing, renewing process for various keys is performed by generating and distributing an enabling key block (EKB) comprising the node keys, the leaf keys below the apex node key, whereby data only usable by the devices below the apex node can be distributed.

In this way, by configuring such that a node is set as an apex node, with nodes below that apex node set as related nodes of a category or a subcategory defined by that apex node, a maker, a content provider or the like managing the apex node at the category stage or the subcategory stage can independently generate an enabling key block (EKB) having that node as the apex node, for distribution to devices belonging to the apex node and nodes therebelow. This hence permits renewal of keys without affecting by any means devices that belong to the nodes of other categories which do not belong to the apex node.

Figure 12:
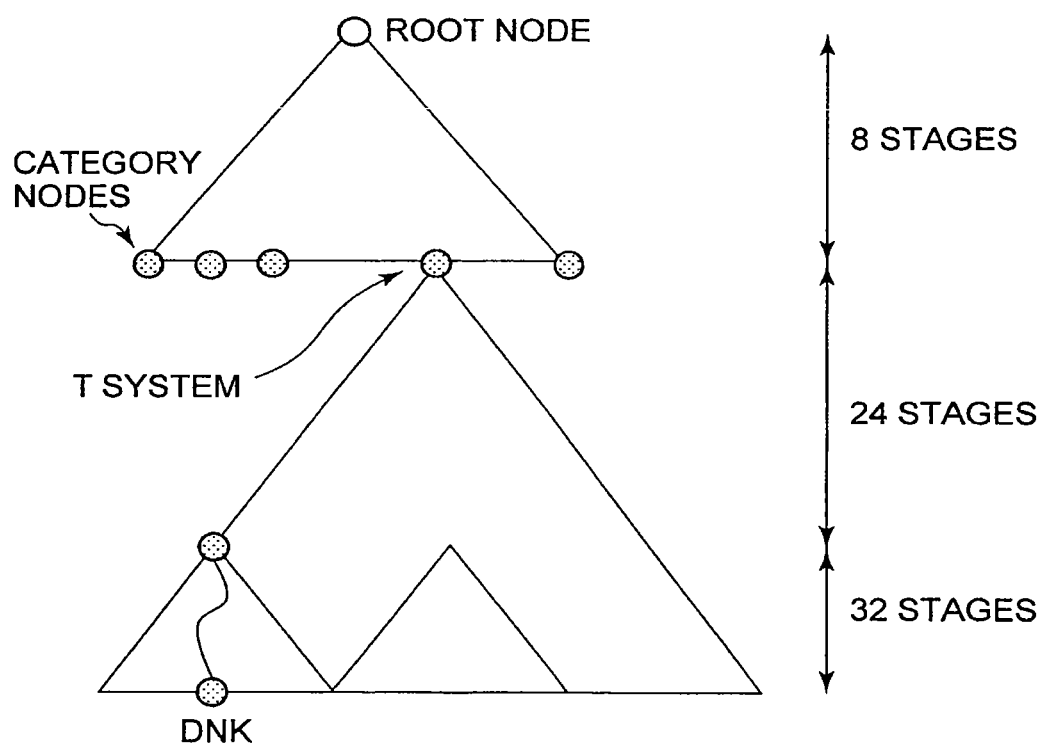
FIG. 12 is a diagram explaining categorization in a tree structure.

For example, as shown in FIG. 12, key management is implemented by a tree-configured system. In an example shown in FIG. 12, nodes at 8+24+32 stages form a tree structure, wherein categories are made to correspond to the nodes at a position 8 stages lower than the root node. The category herein means a category of equipment that uses a semiconductor memory such as a memory stick, a category of equipment that receives digital broadcasting, or the like. And the present system (referred to as a T system) corresponds to one of these category nodes as a system for managing licenses.

That is, keys corresponding to the nodes belonging to the 24 stages further below the T system node exclusive of the T system node are applied to service providers as management entities such as shop servers, license servers, or to services provided by the service providers. In the case of this example, this configuration enables a total of $2^{24}$ (approximately 16 mega) service providers or services to be defined. Furthermore, the 32 stages on the lowermost side enables a total of $2^{32}$ (approximately 4 giga) users (or user devices) to be defined. Keys respectively corresponding to the nodes on a path from the nodes at the lowermost 32nd stage to the T system node constitute a DNK (Device Node Key), and an ID corresponding to the lowermost leaf is a leaf ID.

For example, a content key obtained by encrypting content is encrypted by a renewed root key KR', and a renewed node key at an upper stage is encrypted using a renewed node key at a stage immediately therebelow, and they are arranged in an EKB. The renewed node key at one stage above the terminal stage in the EKB is encrypted by a node key or leaf key at the terminal stage in the EKB, and it is arranged in the EKB.

A user device decrypts a renewed node key at a stage immediately thereabove, which is written in the EKB distributed together with the content data, using any key of the DNK written in service data, and decrypts a renewed node key at the stage further immediately thereabove which is written in the EKB, using the key obtained by the decryption. By sequentially performing the above process, the user device can acquire the renewed root key KR'.

As mentioned above, by categorizing a tree, it can be configured to set nodes such that one node is an apex node and nodes below that apex node are set as related nodes of a category or a subcategory defined by that apex node. As a result, a configuration is implemented, wherein a maker, a service provider, or the like that manages an apex node at a category stage or a subcategory stage independently generates an enabling key block (EKB) having that node as the apex, for distribution to devices belonging to the nodes below that apex node.

Furthermore, some forms of content distribution and use will be described, in which the EKB distribution configuration based on a plurality of categories is adopted by applying the above-mentioned EKB distribution system according to the tree-based device management.

Figure 13:
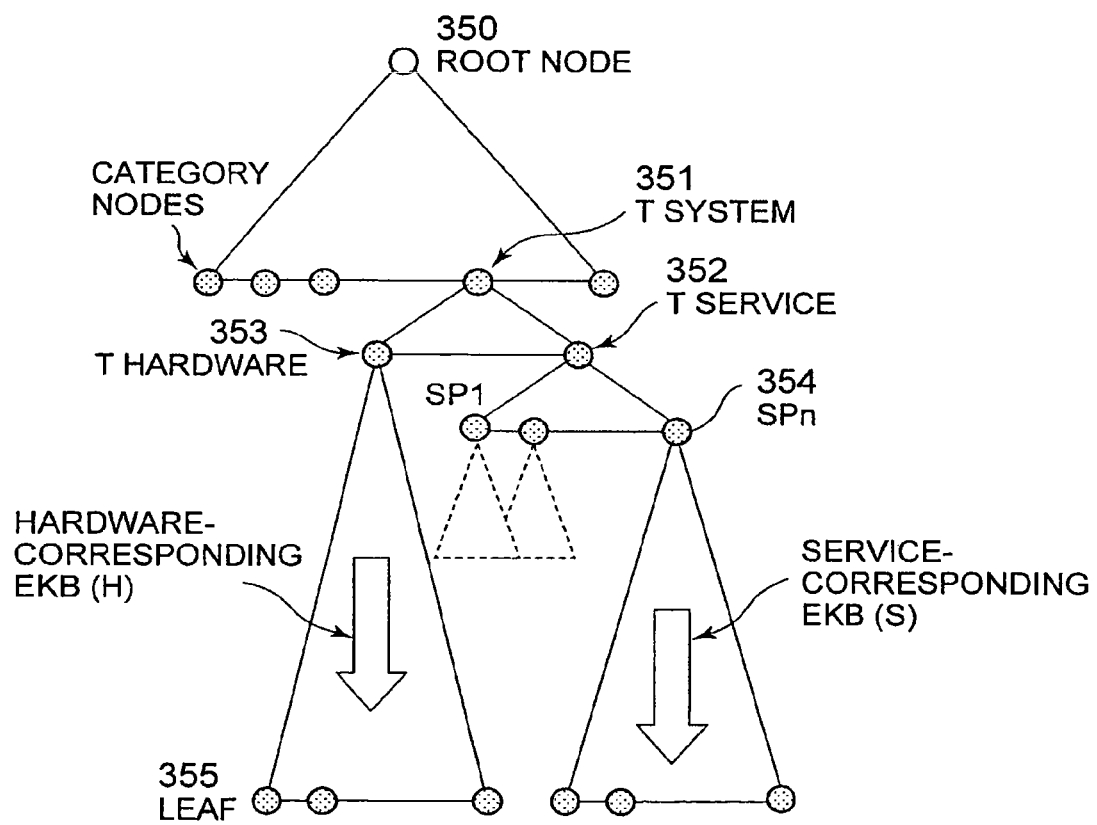
FIG. 13 is a diagram explaining a specific example of categorization in a tree structure.

Referring to FIG. 13, two categories will be described. As shown in FIG. 13, a T system node 351 is set at a stage below a root node 350, and a T service node 352 and a T hardware node 353 are set at a stage therebelow. The tree having the T hardware node 353 as the apex is a category tree in which user device equipment itself is set as a leaf 355 and which distributes a hardware-corresponding EKB [EKB(H)] issued to the equipment. On the other hand, the tree having the T service node 352 as the apex is a category tree for distributing a service-corresponding EKB [EKB(S)] issued so as to correspond to a service provided to the user device equipment.

Each of the hardware-corresponding EKB [EKB(H)], the service-corresponding EKB [EKB(S)] can be decrypted with a DNK (Device Node Key), i.e., keys respectively corresponding to nodes on a path from a leaf to the T system node, which is given to any device having legitimate rights.

[3. Use of Content on the Basis of a License]

Next, a using process for encrypted content stored on the 2nd session of the information recording medium will be described. An information processing apparatus such as a PC, into which the information recording medium having encrypted content stored thereon is set, performs use of the content on the basis of a license stored, together with the encrypted content, on the 2nd session of the information recording medium.

In a configuration of the present invention, when the encrypted content is used in accordance with the license, the license can be acquired from the 2nd session of the information recording medium. Note that the license includes, as mentioned earlier, the usage right information and the encryption key information.

In FIG. 14 (a), there is shown an example data configuration of service data including encryption key information. As shown in FIG. 14 (a), service data 411 includes a leaf ID unique to a client set in an EKB distribution tree, a service ID as a service identifier, further an encryption key information E(Kroot, DNK) obtained by encrypting a device node key (DNK) with a root key (Kroot).

In FIG. 14 (b), there is shown an example data configuration of usage right information as license information. As shown in FIG. 14 (b), usage right information 412 stores a usage right information ID as a usage right information identifier, a time stamp as information about date-of-issuance information, a leaf ID unique to a client, and a content ID and further, information about the type of usable content subject to usage conditions if the usage right information corresponds to the content. Note that the content ID may be configured as enumerating content IDs of individual encrypted content items stored on the 2nd data storage area of the information recording medium shown in FIG. 1, or may be configured as setting a product ID.

In FIG. 14 (c), there is shown a configuration of a content file 413. The encrypted content file recorded on the second data recording field 12 of the information recording medium 10 shown in FIG. 1 is recorded on a disk as data having content data (Enc(Kc, Content) encrypted with a content key [Kc], content key data (Enc((Kroot, Kc) encrypted with a root key [Kroot], an EKB that allows only a user having legitimate usage rights to acquire the root key [Kroot] by decryption, and a service ID.

In FIGS. 15 and 16 there is shown an example of usage right information described in a license that is stored together with encrypted content on the 2nd session of the information recording medium.

Usage right information shown in FIG. 15 describes conditions for a direct playback process and an import process for the content stored on the 2nd session. Usage right information shown in FIG. 16 is a license, i.e., content usage right information that in a case where the content stored on the 2nd session is imported to an information processing apparatus such as a PC, is stored, together with the imported content, on a storage means (e.g., a hard disk) of the information processing apparatus such as a PC.

The usage right information (license) corresponding to the content is stored on the 2nd session of the information recording medium, and usage conditions shown in FIGS. 15 and 16 are described in the usage right information (license). Before importing, a user device such as a PC causes a usage right information interpreting module within the user device to interpret the usage right information shown in FIG. 15 of the usage right information (license), and performs use of the content, i.e., a content playback or import process conditional on the process conforming to a content usage condition specified in the usage right information. A program executed by the usage right information interpreting module is a player that is conditional on the usage right information (license information) stored on the information recording medium being applied. The information processing apparatus executes the player that is conditional on the usage right information (license information) stored on the information recording medium being applied, by installation as necessary.

After the import, the user device such as a PC causes the usage right information interpreting module within the user device to interpret the usage right information (license) imported together with the encrypted content, i.e., the usage right information shown in FIG. 16, and performs use of the content, i.e., a content playback or check-out, or a CD-R burn process on condition that such use conforming to a usage condition. Note that the usage right information shown in FIGS. 15 and 16 is only an example, and thus it is arbitrary to set various other usage conditions.

Referring to FIG. 15, the content usage right information will be described. In FIG. 15, there is shown an example of content usage right information before performing an import process for content. As a playback condition as one of the content usage rights, time-limit and max count of playback are set. As to the time-limit, one can set "without limit" or "with limit". In a case of with limit, content playable start-time and end-time are set. As to the max count of playback, one can set "without limit" or "with limit". In the case of with limit, a max count of playback for the content is set. This value is updated by the usage right information interpreting module within the user device when a content playback process is performed. The performing of one playback process decrements the max count by 1.

Further, as an import condition as one of the content usage rights, whether or not offline import and online import are permitted is set. The offline import is a process of importing encrypted content directly from the information recording medium, whereas the online import is a process of importing encrypted content, not from the information recording medium, but online through connection via a pre-set content provider and a network. In the license, whether or not the offline import and the online import are permitted is set as the content import condition.

In a case where the content stored on the 2nd session of the information recording medium is to be ripped (digitally copied) to a hard disk of a PC or the like, the usage right information interpreting module within the PC interprets the usage conditions specified in the license, and import is performed on condition that the content is offline importable.

In a case where the content is to be imported, the usage right information (license) describing the usage conditions for the imported content is imported, together with the encrypted content stored on the 2nd session of the information recording medium. An example of the usage conditions described in this imported license will be described with reference to FIG. 16.

FIG. 16 shows an example of usage right information for imported content. As a playback condition, time-limit and max count of playback are set. As to the time-limit, one can set "without limit" or "with limit". In a case of with limit, content playable start-time and end-time are set. As to the maxi count of playback, one can set "without limit" or "with limit". In the case of with limit, a max count of playback for the content is set. This value is updated by the usage right information interpreting module within the user device when a content playback process is performed. The performing of one playback process decrements the max count by 1.

Further, as a check-out condition, device category and max count of check-out are set. The device category is set as flag information that can identify a device category. The usage right information interpreting module within the user device such as a PC identifies the flag information to determine whether or not the device category is check-out capable. Only when the device category is check-out capable, check-out is performed.

As to the max count of check-out, one can set "without limit" or "with limit". In a case of with limit, a max count of check-out for the content is set. The max count of check-out is the number of portable media (PM) that can use the content simultaneously. The PM include recording media usable in a portable device, such as a flash memory, or a small-sized HD, an optical disc, a magneto-optical disc, an MD (Mini Disk).

In a case where the usage right information interpreting module within the user device such as a PC has verified the usage right information and found that the max count of check-out is set to "with limit", check-out is permitted only if the count is within the limited number. This value is updated in the usage right information interpreting module within the user device when a check-out process is performed. The performing of one check-out process decrements the max count by 1. Further, a check-in process is performed to increase the max count.

Furthermore, as a CD-R burn condition, device category capable of CD-R burn and max count of CD-R burn are set. The device category is set as flag information that can identify a device category. The usage right information interpreting module within the user device such as a PC identifies the flag information to determine whether or not the device category is CD-R burn capable. Only when the device category is CD-R burn capable, CD-R burning is performed.

As to the max count of CD-R burn, one can set "without limit" or "with limit". In the case of with limit, a max count of CD-R burn is set. When the usage right information interpreting module within the user device such as a PC has verified the usage right information and found that the max count of CD-R burn is set to "with limit", CD-R burning is permitted only when the count is within the limited number. This value is updated by the usage right information interpreting module within the user device when a CD-R burn process is performed. The performing of one CD-R burn process decrements the max count by 1.

Next, a sequence of a playback and import process for content stored on the 2nd session of the information recording medium will be described with reference to FIG. 17.

The process shown in FIG. 17 is a processing sequence used in a case of performing a playback and import process for the content stored on the 2nd session of the above-mentioned information recording medium (such as a CD, a DVD, an MD) in an information processing apparatus (such as a PC) capable of the ripping process as digital copying.

If, in step S101, the information recording medium such as a CD is set, a content list is displayed on a display of the information processing apparatus according to a starting program. Displayed on a display screen is a GUI such as buttons through which a user can select the performing or non-performing of a license-applied process. In a case where, in step S102, the user does not select the usage right information (license)-applied process, then in step S111, the content is sequentially played by the bundle player stored on the 2nd session of the information recording medium. This playback of the content is a direct process from the recording medium; the encrypted content is automatically decrypted and automatically played according to a processing program in the bundle player.

If, in step S102, the user selects the usage right information (license)-used process, it is determined in step S102 whether the user selected a license-based content playback process or a license-based content import process. This is performed by the usage right information interpreting module within the user device as a process of interpreting the usage conditions specified in the usage right information (license).

In a case where the user has selected the usage right information (license)-based content playback process, the sequence proceeds to step S104 and determines whether or not the content is playable based on the usage right information in the license (see FIG. 15) corresponding to the content. Specifically, the process verifies a condition set as a usage condition, such as whether the content is still usable in terms of its time limit, its max count of playback.

In a case where it is determined in step S105 that the usage condition for playback is not met, the sequence is terminated without playing the content. In a case where it is determined in step S105 that the usage condition for playback is met, then in step S106, an acquiring process for a content key, a decrypting process for the encrypted content based on the acquired content key are performed, to play the content in step S107.

In a case where the process designated by the user is found to be the usage right information (license)-based content import process in step S103, the sequence proceeds to step S121 and determines whether or not the content is importable on the basis of the usage right information (see FIG. 15) in the license corresponding to the content. In this case, it is to import the encrypted content from the information recording medium, which is the offline import, and thus whether or not the content is offline-importable is determined.

In a case where it is determined in step S122 that the import condition is not met, the sequence is terminated without importing. In a case where it is determined in step S122 that the import condition is met, then in step S123, the encrypted content and the usage right information (license) corresponding to the encrypted content that are stored on the 2nd session of the information recording medium are stored on the user device (such as a PC). Stored as this imported license is the usage right information described earlier with reference to FIG. 16. The imported content is used after determined to be usable on the basis of the imported usage right information (license).

Of the processes described with reference to FIG. 17, the content import process has been described on the premises that the encrypted content and the usage right information (license) corresponding to the encrypted content are stored on the 2nd session of the information recording medium. However, there may be forms wherein a license is stored on the information recording medium or is not stored on the information recording medium, according to content. Further, there may be forms wherein certain content is made importable only online as described with reference to FIG. 15. In the case of such a setting, the user acquires a license for the import process from a license provider.

Figure 18:
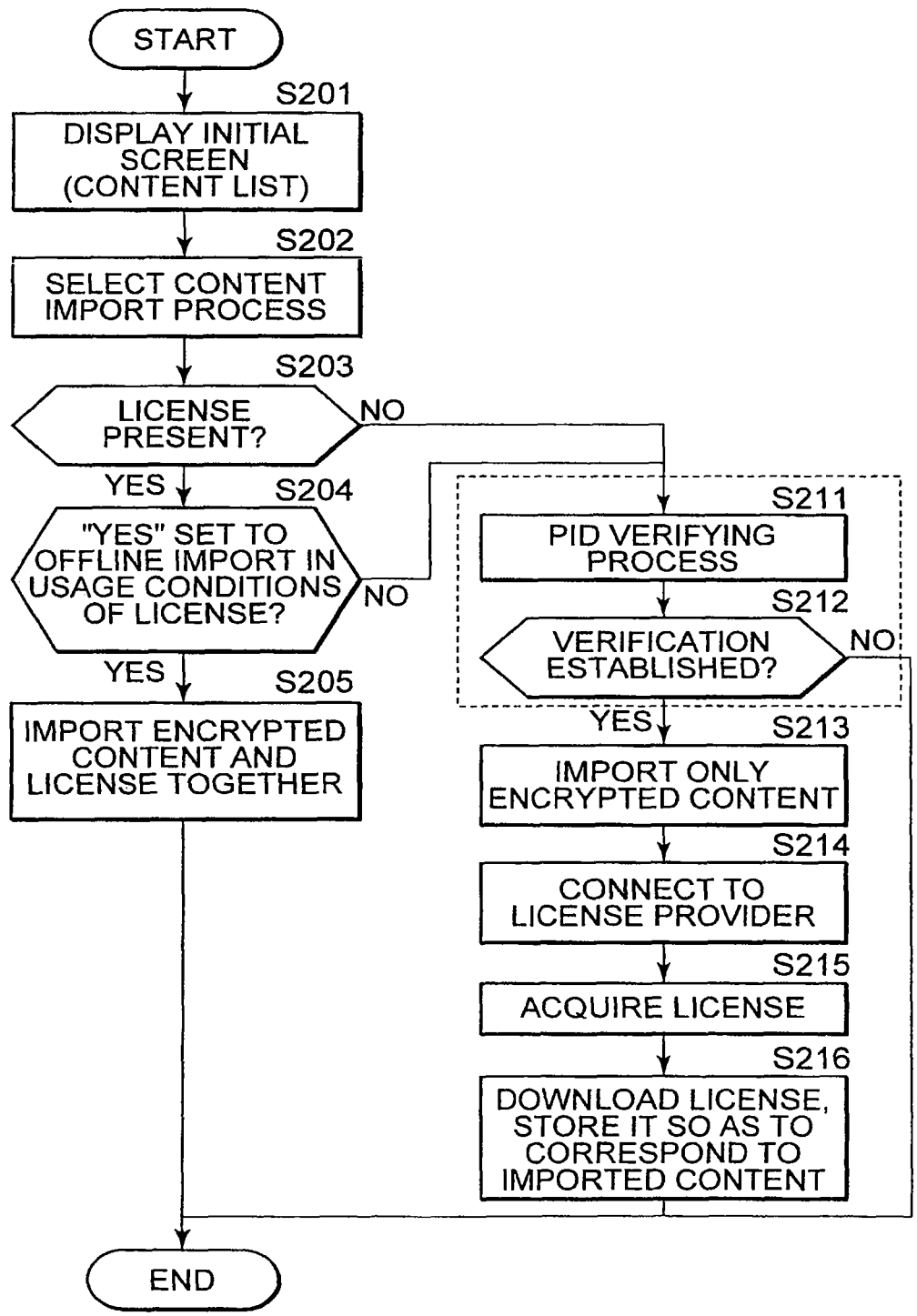
FIG. 18 is a diagram explaining a sequence of an acquiring process for a license corresponding to content.

Such a license acquiring processing sequence will be described with reference to a processing flow of FIG. 18. In step S201, the content list is displayed on the display of the information processing apparatus, according to the starting program. Displayed on the display screen is the GUI such as buttons through which the user can select the performing or non-performing of a license-applied process. If, in step S202, the user selects an import process by designating a content item, then in step S203, a search is made as to whether or not the usage right information (license) corresponding to the content item is stored on the information recording medium.

In a case where the usage right information (license) is stored, the sequence proceeds to step S204 to determine whether or not offline import is permitted according to the descriptions of the usage right information (license), i.e., according to the usage conditions (see FIG. 15). In a case where offline import is permitted, then in step S205, the encrypted content item and the license are imported together. This process is similar to the process described with reference to FIG. 17.

In a case where, in step S203, the usage right information (license) corresponding to the content item is not stored on the information recording medium, or in a case where, in step S204, offline import is not permitted as a usage condition described in the usage right information (license), then the sequence proceeds to step S211.

In step S211, a verifying process for a PID (Postscribed-ID) is performed.

As described earlier with reference to FIG. 3, the PID has a media ID that is identifying data unique to each disk and other data, with a MAC appended thereto as a falsification verifying code for each of the data. In step S211, the usage right information interpreting module within the user device newly calculates a MAC that is based on the data in the PID, for matching with a stored MAC. If the calculated MAC and the stored MAC match, the sequence, deeming that the PID data has not been falsified with, establishes PID verification (yes to step S212). In a case where the calculated MAC and the stored MAC do not match (No to step S212), the sequence, judging that the PID data has been falsified with, is terminated without importing.

If the verification has been established, in step S213, only the encrypted content is imported from the information recording medium. Furthermore, in step S214, a connection is made to a license provider. Since the information recording medium stores the URL (Uniform Resource Locator) of the license provider necessary to acquire the license, so as to correspond to the content item, the user connects to the license provider in accordance with the URL.

In step S215, the license corresponding to the content item is acquired from the license provider. Set in this acquired license are also the content usage conditions described with reference to FIG. 16. In step S216, the acquired license is downloaded, and stored on a recording medium such as a hard disk of the user device (such as a PC) so as to correspond to the encrypted content item previously imported from the information recording medium.

Note that the PID verifying process performed in steps S211 and S212 may be omitted. Further, it may be configured such that the license provider performs the PID verification. That is, after connected to the license provider in step S214, the user device transmits the PID read from the information recording medium to the license provider, to cause the license provider to perform the MAC verification to determine whether or not the data has been falsified with. Further, it may be configured such that the license provider holds a list of valid or invalidated PIDs, and performs a process of confirming the validity of the received PID.

In a case where the license provider has determined that the PID has been falsified with, or in a case where the PID has been found to be invalid in accordance with the list, the license provider stops issuing the license corresponding to the imported content item.

Furthermore, it may be configured such that by causing the information processing apparatus of the user to transmit the PID to a service provider when an import process is to be performed, the service provider manages the number of import processes performed from the information recording medium such as a CD having the same PID, for billing according to the import processes performed.

In this way, the encrypted content stored on the information recording medium is available in two forms: with or without a license having its usage conditions set therein. In a case where the license is stored on the information recording medium, the license is imported directly from the information recording medium for use of the imported content in accordance with the imported license. In a case where the license is not stored on the information recording medium, only the encrypted content is imported from the information recording medium, and the license is acquired from a license provider for storage so as to correspond to the imported content. And the imported content is used in accordance with the license acquired from the license provider.

Figure 19:
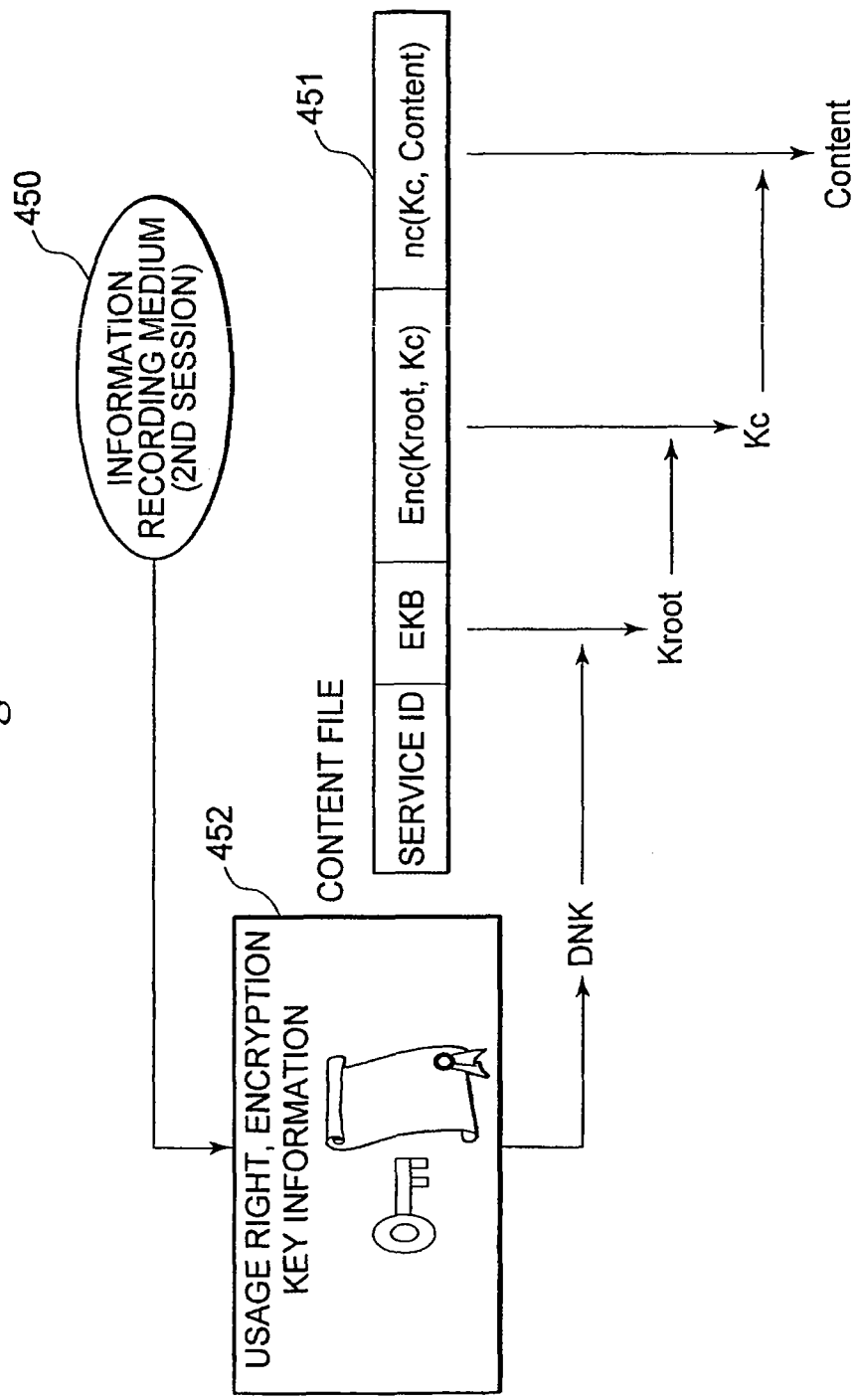
FIG. 19 is a diagram explaining an outline of the content playback process.

A basic procedure of the content playback process will be described with reference to FIG. 19. A content file 451 including encrypted content and a license 452 including usage right information are read from a second data recording field (second session) 450 of the information recording medium shown in FIG. 1, whereby the decrypting process for the encrypted content in the content file 451 is performed, by applying the usage right information (license), encryption key information 452.

The content included in the content file 451 is encrypted with a content key Kc (Enc(Kc, Content), and the content key Kc is a key obtained from a root key Kroot that can be acquired from an EKB.

A user device such as a PC acquires a device node key (DNK) from service data in the license, decrypts the EKB for the content file based on the acquired DNK to acquire the root key Kroot, and further decrypts Enc(Kroot, Kc) using the acquired root key Kroot to acquire the content key Kc, and performs a decrypting process for the encrypted content Enc (Kc, Content) with the acquired content key Kc to acquire the content for playback.

Details of the content playback process will be described with reference to FIG. 20, which is made to correspond to service data, usage right information (license).

Figure 20:
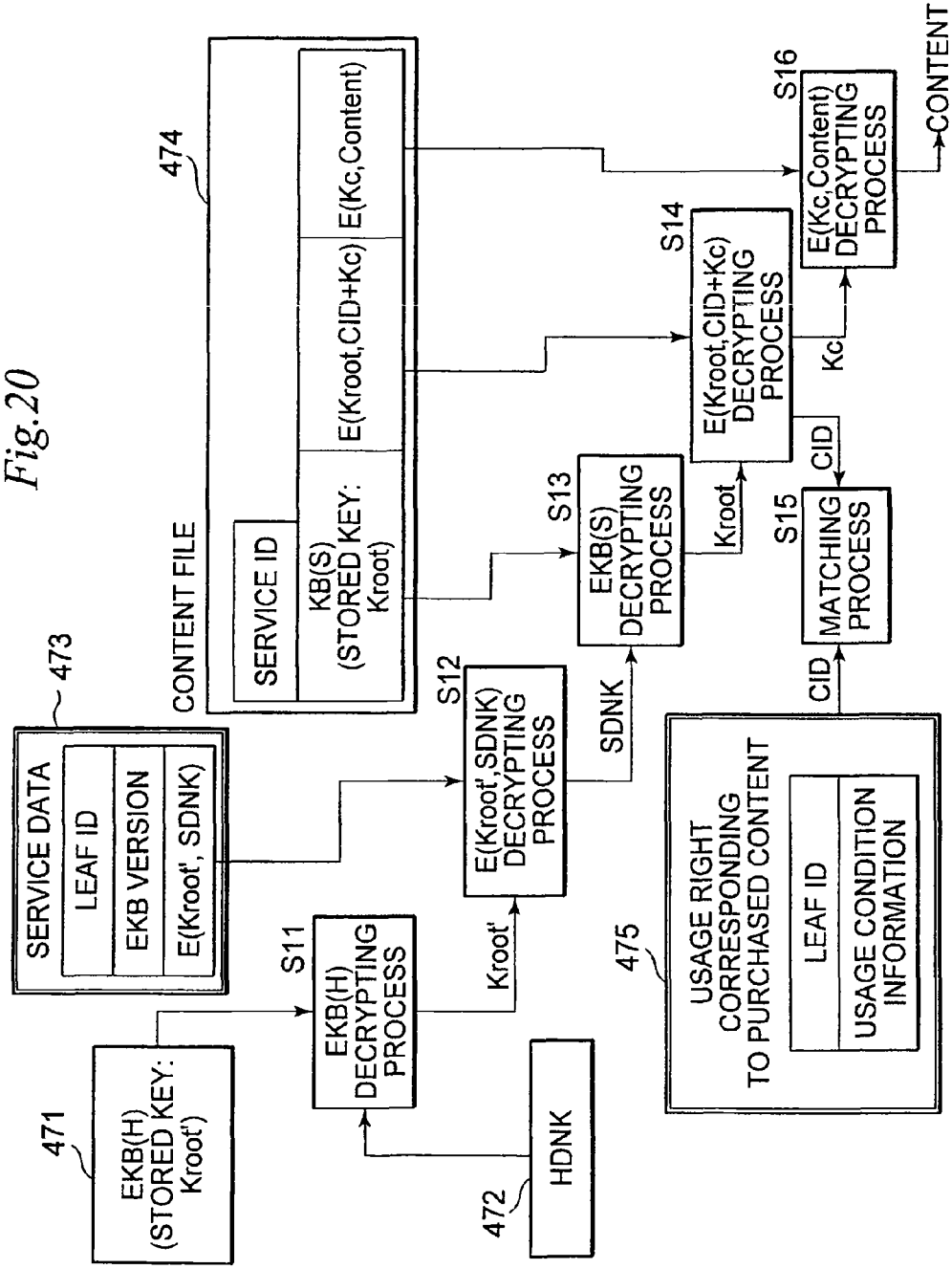
FIG. 20 is a diagram explaining an example content decrypting, using process to which an enabling key block (EKB) is applied.

FIG. 20 is a diagram illustrating a sequence of a content using process based on a decrypting process for content to which a hardware-corresponding EKB [EKB(H)], a service-corresponding EKB [EKB(S)] are applied.

An encrypted content file 474, service data 473 including encryption key information, and usage right information (license) 475 shown in FIG. 20 are data read from the second data recording area (second session) of the information recording medium. The service data 473 stores a leaf ID as a leaf identifier, an EKB version to be applied, data E(Kroot', SDNK) obtained by encrypting a service-corresponding device node key (SDNK) necessary for decrypting the service-corresponding EKB [EKB(S)] with a root key Kroot' set so as to correspond to a hardware-corresponding category tree.

The encrypted content file 474 is a file that includes the service-corresponding EKB [EKB(S)] storing a root key Kroot set so as to correspond to a service-corresponding category tree, data E(Kroot, CID+Kc) obtained by encrypting a content ID (CID) and a content key (Kc) applied to content encrypting and decrypting processes with the root key Kroot, and data E(Kc, Content) obtained by encrypting the content (Content) with the content key Kc.

Further, the usage right information 475 is data that stores the leaf ID and usage condition information as to the content. The content usage condition information includes various usage conditions such as time-limit, count of use, copying limit set so as to correspond to the content. The user device that has received the usage right information 475 either stores the usage right information as security information corresponding to the content, or stores it in an AV index file set to a playback apparatus (such as a PC) as index data for the content.

In step S11 shown in FIG. 20, the user device performs a decrypting process for a hardware-corresponding EKB(H) 471 by applying a hardware-corresponding device node key (HDNK) 472, to acquire the root key Kroot' set so as to correspond to the hardware-corresponding category tree, from the EKB(H) 471. The DNK-applied process for the EKB is a process according to the technique described earlier with reference to FIG. 8.

Next, in step S12, the user device performs a decrypting process for the encrypted data E(Kroot', SDNK) in the service data 473, using the root key Kroot' extracted from the EKB (H), to acquire the device node key (SDNK) applied to a process (decryption) for the service-corresponding EKB [EKB(S)].

Next, in step S13, the user device performs the process (decryption) for the service-corresponding EKB [EKB(S)] stored in the encrypted content file 474, using the device node key (SDNK) extracted from the service data, to acquire the root key Kroot set so as to correspond to the service-corresponding category tree stored in the service-corresponding EKB [EKB(S)].

Next, in step S14, the user device performs a decrypting process for the encrypted data E(Kroot, CID+Kc) stored in the encrypted content file 474, using the root key Kroot extracted from the service-corresponding EKB [EKB(S)], to acquire the content ID (CID) and the content key (Kc).

Next, in step S15, a matching process is performed between the content ID (CID) extracted from the encrypted content file 474 and a content ID stored in the usage right information. If the content is confirmed to be usable from the matching process, in step S16, the encrypted content E(Kc, Content) stored in the encrypted content file 474 is decrypted by applying the content key (Kc) extracted from the encrypted content file 474, to play the content.

As described above, both the hardware-corresponding EKB [EKB(H)] as an EKB corresponding to a category tree set so as to correspond to hardware as content using equipment and the service-corresponding EKB [EKB(S)] as an EKB corresponding to a category tree set so as to correspond to a content using service are provided individually to the user, whereby only the user having legitimate DNKs for the respective EKBs can use the service.

The DNK for decrypting the service-corresponding EKB [EKB(S)], i.e., the SDNK is stored on the 2nd session of the information recording medium shown in FIG. 1 as the service data 473 corresponding to the content, and thus the user device can acquire it from the information recording medium. Further, by configuring such that the SDNK is encrypted by applying the root key Kroot' which is set so as to correspond to the hardware-corresponding category tree and which can be acquired only by equipment having a legitimate hardware-corresponding DNK, i.e., a HDNK, only the user device having the legitimate HDNK can acquire the SDNK to use the service.

Further, in using the content, by configuring such that the matching process is performed between the content identifier (CID) acquired from the encrypted content file 474 and the CID acquired from the usage right information, it can be made essential to store the CID information by acquisition of the usage right information 475 in order to perform a content playback process, whereby use of content according to usage conditions is implemented.

[4. Example Configuration of an Information Processing Apparatus]

Figure 21:
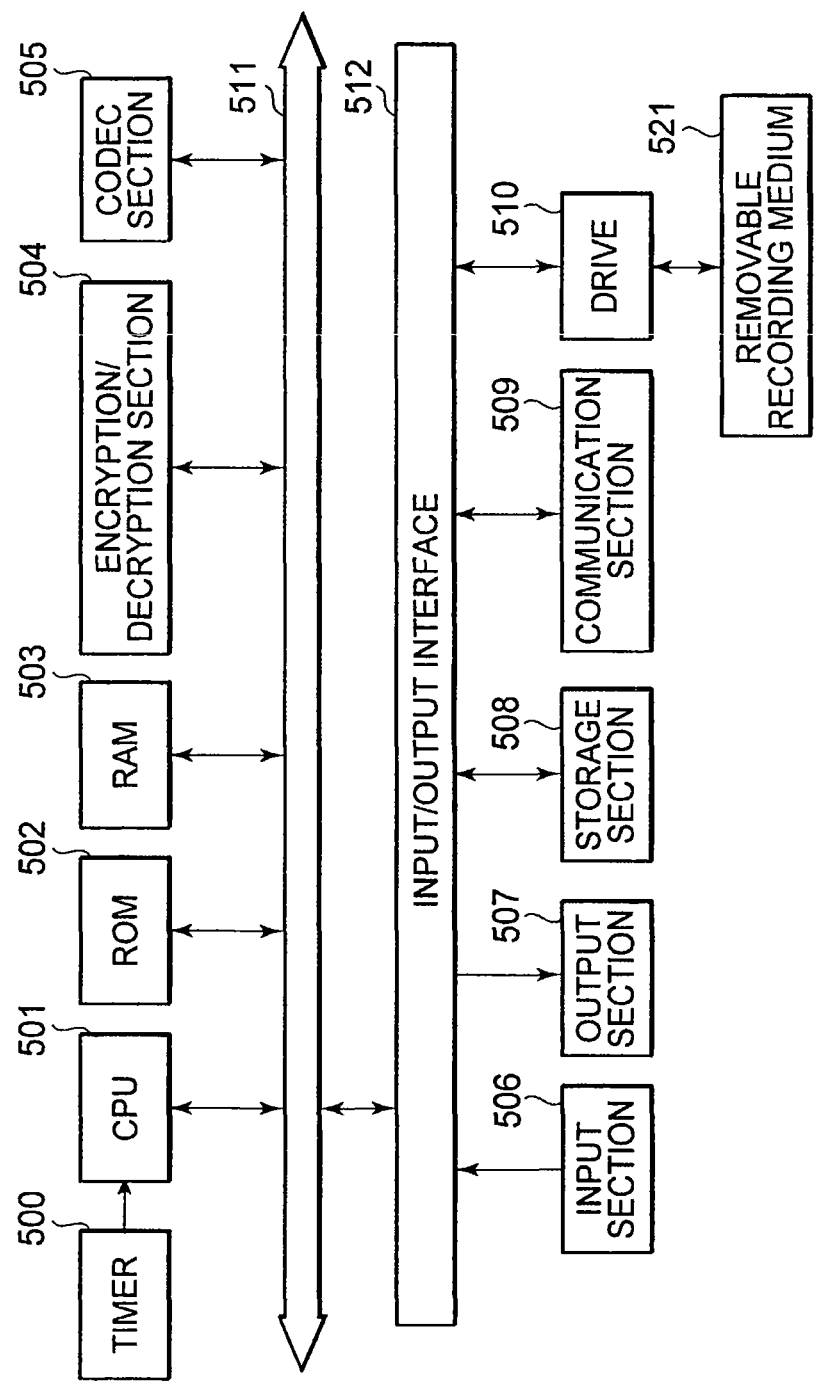
FIG. 21 is a diagram showing an example configuration of an information processing apparatus.

Next, an example configuration of an information processing apparatus such as a PC will be described with reference to FIG. 21, which apparatus uses the encrypted content recorded on the second session of the information recording medium described with reference to FIG. 1.

A CPU (Central Processing Unit) 501 performs various processes according to various programs stored on a ROM (Read Only Memory) 502 or programs stored on a storage section 508 and loaded into a RAM (Random Access Memory) 503. A timer 500 performs a time-measuring process, and supplies clock information to the CPU 501.

The ROM (Read Only Memory) 502 stores the programs, parameters for computation, fixed data, and the like used by the CPU 501. The RAM (Random Access Memory) 503 stores the programs which the CPU 501 uses in its execution, and parameters and the like that properly change during their execution. These elements are interconnected via a bus 511.

An encrypting/decrypting section 504 performs an encrypting process for communication data or content, an encrypting process to which, e.g., a DES (Data Encryption Standard) encrypting algorithm is applied as a process of applying a device node key (DNK), an enabling key block (EKB), MAC generation, verifying process, and the like. Furthermore, it performs various encrypting processes, such as authentication and a session key sharing process at the time various data such as license information is exchanged with another connected apparatus.

A codec section 505 performs data encoding, decoding processes in various systems, such as an ATRAC (Adaptive Transform Acoustic Coding) 3 system, MPEG, JPEG systems. Data for processing is inputted from a removable storage medium 521 or via a communication section 509, through the bus 511, an input/output interface 512, a drive 510. Further, the processed data is stored on the removable storage medium 521, or outputted via the communication section 509, as necessary.

Connected to the input/output interface 512 are an input section 506 such as a keyboard, a mouse, and the like, an output section 507 including a display such as a CRT, an LCD, speakers, the storage section 508 such as a hard disk, the communication section 509 implemented by a modem, a terminal adapter, or the like, for data transmission/reception via a communication network such as the Internet.

The present invention has been described in great detail with reference to specific embodiments in the foregoing. However, it is obvious that those skilled in the art can make modifications to and substitutions for the embodiment without departing from the scope and spirit of the present invention. That is, the present invention has been disclosed by way of examples, and thus should not be construed in a restrictive sense. In order to judge the scope and spirit of the present invention, the appended claims should be taken into consideration.

Note that a series of processes described in the specification can be performed by hardware, or software, or a configuration having both combined. In a case of performing the processes depending on software, the processes can be performed by installing a program having recorded processing sequences therein to a memory within a computer incorporated into dedicated hardware, for execution, or by installing the program into a general-purpose computer that can perform various processing, for execution.

For example, the program can be recorded on a hard disk and a ROM (Read Only Memory) as recording media beforehand. Alternatively, the program can be stored (recorded) temporarily or permanently on a removable recording medium, such as a flexible disk, a CD-ROM (Compact Disc Read Only Memory), a MO (Magneto optical) disc, a DVD (Digital Versatile Disc), magnetic disk, a semiconductor memory. Such a removable recording medium can be provided as so-called package software.

Note that the program can be installed to the computer from a removable recording medium such as mentioned above, and additionally, through wireless transmission to the computer from a download site, wired transmission to the computer via a network such as a LAN, the Internet to allow the computer to receive the thus transmitted program for installation to a storage medium such as a hard disk incorporated therein.

Note that the various processes described in the specification are performed not only time-sequentially according to the description, but also parallely or individually according to the processing capacity of an apparatus that performs a process or as necessary.

INDUSTRIAL APPLICABILITY

According to the configuration of the present invention, the information recording medium such as a CD stores an encrypted content file including encrypted content, usage right information of the encrypted content, and encryption key information necessary for a decrypting process for the encrypted content. Thus, a user can acquire a license (usage right information) and key information necessary for decryption of the content, together with the content, from the information recording medium, without acquiring the license (usage rights) by connection to a license provider. Therefore, it is no longer necessary to perform a process of acquiring the license (usage rights) from the license provider when the content is to be used, whereby user convenience is improved, and license-based content copyright management can also be ensured.

Furthermore, according to the configuration of the present invention, when the information processing apparatus performing use of an information recording medium having encrypted content stored thereon is to import the encrypted content to a storage means such as a hard disk within the information processing apparatus, the usage right information describing usage conditions for the content that has been imported is set and stored on the storage means such as a hard disk. Thus, use of the content that has been imported is limited according to the usage right information imported together with the content, and thus a reliable, license-based use of the content is implemented also for the content that has been imported.

Furthermore, according to the configuration of the present invention, a media identifying data (PID: Post scribed-ID) as an identifier unique to the information recording medium is stored on the information recording medium, and a MAC (Message Authentication Code) as data for verifying falsification is included for the PID. Thus, in addition to confirmation of usage rights based on the usage right information stored on the information recording medium, a usage permission is given on condition that the PID is not falsified through PID verification at the time the content is used, whereby a higher level of content usage management can be made possible.

Furthermore, according to the configuration of the present invention, the encrypted content file is a file including encrypted content, an encrypted content key that is encrypted data on a content key as a decryption key for the encrypted content, and an enabling key block (EKB) as encrypted key data that can acquire keys applied to decryption of the encrypted content key, and the encryption key information stored on the information recording medium is set as a device node key (DNK) as key information applied to a process for the enabling key block (EKB) included in the encrypted content file. Thus, by performing key management for the device node key (DNK), content usage management under a strict license control can be made possible.

Furthermore, according to the configuration of the present invention, the information recording medium includes a plurality of different forms of encrypted content files, which are an encrypted content file usable on the basis of a confirming process for usage rights according to the usage right information stored on the information recording medium, and an encrypted content file usable on the basis of a confirming process for usage rights according to the usage right information that is not stored on the information recording medium, but that can be acquired from a license provider. Thus, user convenience for using the content is realized, and an effect of promoting user access to a license provider is also realized.

What is claimed is:
1. A non-transitory information recording medium, comprising:
an encrypted multimedia content,
usage right information,
wherein the usage right information specifies:
if the encrypted multimedia content is importable into an information processing apparatus;
when the encrypted multimedia content is importable, importing both the encrypted multimedia content and the usage right information into the information processing apparatus; and a usage condition of the encrypted multimedia content after the encrypted multimedia content is imported into the information processing apparatus; and a copy-protected multimedia content containing the same multimedia content as the encrypted multimedia content, wherein the copy-protected multimedia content is capable to be reproduced by the information processing apparatus but is not capable to be copied to a non-volatile storage medium of the information processing apparatus.

2. A method for providing an information recording medium with a multi-session configuration, the method comprising:

storing an encrypted multimedia content on the information recording medium, storing usage right information on the information recording medium, wherein the usage right information specifies:

if the encrypted multimedia content is importable into an information processing apparatus;

when the encrypted multimedia content is importable, importing both the encrypted multimedia content and the usage right information into the information processing apparatus; and a usage condition of the encrypted multimedia content after the encrypted multimedia content is imported into the information processing apparatus, and storing a copy-protected multimedia content containing the same multimedia content as the encrypted multimedia content, wherein the copy-protected multimedia content is capable to be reproduced by the information processing apparatus but is not capable to be copied to a non-volatile storage medium of the information processing apparatus.

3. The non-transitory information recording medium of claim 1, further comprising:

a media identifying data unique to the information recording medium for verifying if the information recording medium is falsified.

4. The method of claim 2, further comprising:

storing a media identifying data on the information recording medium, wherein the media identifying data is unique to the information recording medium and is used for verifying if the information recording medium is falsified.

* * * * *